United States Patent
Bukovsky

(10) Patent No.: US 12,410,329 B2
(45) Date of Patent: Sep. 9, 2025

(54) RADIATION-CURABLE, NONRADIATION-CURABLE COPOLYMER SYSTEM FOR ADDITIVE MANUFACTURING

(71) Applicant: Lawrence Livermore National Security, LLC, Livermore, CA (US)

(72) Inventor: Eric Bukovsky, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 808 days.

(21) Appl. No.: 17/440,091

(22) PCT Filed: May 30, 2019

(86) PCT No.: PCT/US2019/034703
§ 371 (c)(1),
(2) Date: Sep. 16, 2021

(87) PCT Pub. No.: WO2020/242483
PCT Pub. Date: Dec. 3, 2020

(65) Prior Publication Data
US 2022/0186053 A1   Jun. 16, 2022

(51) Int. Cl.
| | |
|---|---|
| C09D 11/00 | (2014.01) |
| B29C 64/106 | (2017.01) |
| B33Y 70/00 | (2020.01) |
| C08G 18/10 | (2006.01) |
| C08G 18/67 | (2006.01) |
| C09D 11/101 | (2014.01) |
| C09D 11/102 | (2014.01) |
| B33Y 10/00 | (2015.01) |

(52) U.S. Cl.
CPC .......... C09D 11/101 (2013.01); B29C 64/106 (2017.08); B33Y 70/00 (2014.12); C08G 18/10 (2013.01); C08G 18/672 (2013.01); C09D 11/102 (2013.01); B33Y 10/00 (2014.12)

(58) Field of Classification Search
CPC ..... C09D 11/101; C09D 11/102; B33Y 70/00; B33Y 10/00; B29C 64/106; C08G 18/672; C08G 18/10
USPC ........................................... 106/31.01, 31.13
See application file for complete search history.

(56) References Cited

U.S. PATENT DOCUMENTS

2015/0099102 A1* 4/2015 Sullivan ................. C09D 11/02
                                                     428/206
2016/0167299 A1   6/2016 Jallouli et al.
(Continued)

OTHER PUBLICATIONS

International Search Report and Written Opinion from PCT Application No. PCT/US2019/034703, dated Oct. 01, 2019.
(Continued)

*Primary Examiner* — James E McDonough
(74) *Attorney, Agent, or Firm* — Zilka-Kotab, P.C.

(57) ABSTRACT

According to one aspect of an inventive concept, an ink includes a nonradiation-curable pre-polymer having at least two nonradiation-curable components per molecule of the nonradiation-curable pre-polymer, a radiation-curable component, a polymer having at least one reactive hydrogen component, and a photoinitiator. A concentration of the nonradiation-curable pre-polymer having at least two nonradiation-curable components is in a range of greater than 0 weight % to less than 99 weight % of a total weight of the ink.

25 Claims, 11 Drawing Sheets

(56) References Cited

U.S. PATENT DOCUMENTS

| | | |
|---|---|---|
| 2017/0120515 A1 | 5/2017 | Rolland et al. |
| 2017/0291357 A1 | 10/2017 | Fong et al. |
| 2018/0229436 A1* | 8/2018 | Gu ........................ B29C 64/124 |
| 2018/0264719 A1 | 9/2018 | Rolland et al. |

OTHER PUBLICATIONS

Gratson et al., "Direct writing of three-dimensional webs," Nature, vol. 428, Mar. 25, 2004, 1 page.
Therriault et al., "Fugitive Inks for Direct-Write Assembly of Three Dimensional Microvascular Networks," Advanced Materials, vol. 17, No. 4, Feb. 2005, pp. 395-399.
Lewis et al., "Direct Ink Writing of 3D Functional Materials," Advanced Functional Materials, vol. 16, 2006, pp. 2193-2204.
Lebel et al., "Ultraviolet-Assisted Direct-Write Fabrication of Carbon Nanotube/Polymer Nanocomposite Microcoils," Advanced Materials, vol. 22, 2010, pp. 592-596.
Compton et al., "3D-Printing of Lightweight Cellular Composites," Advanced Materials, vol. 26, 2014, pp. 5930-5935.
Duoss et al., "Three-Dimensional Printing of Elastomeric, Cellular Architectures with Negative Stiffness," Advanced Functional Materials, vol. 24, 2014, pp. 4905-4913.
Sullivan et al., "Controlling Material Reactivity Using Architecture," Advanced Materials, vol. 28, 2016, pp. 1934-1939.
Xu et al., "Solvent-cast based metal 3D printing and secondary metallic infiltration," Journal of Materials Chemistry C, vol. 5, 2017, 9 pages.
Durban et al., "Custom 3D Printable Silicones with Tunable Stiffness," Macromolecular Rapid Communications, vol. 39, 2018, pp.
Durban et al., "Development and Characterization of 3D Printable Thermite Component Materials," Advanced Materials Technologies, 2018, 6 pages.
Zheng et al., "Title: Ultra-light, Ultra-stiff Mechanical Metamaterials," Science, Jun. 2014, 13 pages.
Allnex, "Radcure Coating Resins," Allnex product guide, 2016, 40 pages.
Bayer, "The Chemistry of Polyurethane Coatings," Bayer Material Science, A General Reference Guide, 2005, 31 pages.
IPSUSA, "Proceedings of The 43rd International Pyrotechnics Society Seminar," IPSUSA Seminars, Inc., Jul. 2018, 655 pages.
Grace Period Disclosure, "Polymer Resin Systems for Precision Direct-Ink-Write Printing of Thermite-Loaded Inks," E. V. Bukovsky, B. M. Howell, H. P. Martinez, M. D. Durban, M. D. Grapes, A. M. Golobic, K. T. Sullivan, A. E. Gash, Jul. 2018, 2 pages.
Grace Period Disclosure, "Pragmatic Approach Towards Highly Solids Loaded Resins for Direct-Ink-Write Additive Manufacturing" Brian M. Howell, Eric V. Bukovsky, Michael D. Grapes, Alexandra M. Golobic, Alexander E. Gash, Kyle T. Sullivan, Poster, Jun. 2018, 1 page.
Allnex, "Desmolux Radiation Curing Resins," Allnex, 2013, 12 pages.
Allnex, "EBECRYL 4396 Isocyanate Functional Aliphatic Urethane Acrylate," Techical Data Sheet, Sep. 2015, 1 page.
Allnex, "EBECRYL 4150 Isocyanate Functional Aliphatic Urethane Acrylate," Techical Data Sheet, Sep. 2015, 1 page.
Allnex, "EBECRYL 4765 Isocyanate-bearing aliphatic urethane acrylate," Techical Data Sheet, Jun. 2014, 2 pages.
Allnex, "EBECRYL 4150 Isocyanate-bearing urethane acrylate," Techical Data Sheet, Jun. 2015, 2 pages.
Covestro, "Desmodur N 100," Covestro, Product Datasheet, 2015, 4 pages.
Covestro, "Desmodur N 3200," Covestro, Product Datasheet, 2015, 4 pages.
Ciba, "Photoinitiators for UV Curing," Ciba Specialty Chemicals, Key Products Selection Guide, 2003, 8 pages.
Sigma-Aldrich, "Applications: Free Radical Initiators," Sigma-Aldrich, 2013, 15 pages.
Huntsman, "Jeffamine Polyetheramines," Huntsman, Technical Bulletin, 2012, 8 pages.
Huntsman, "Jeffamine ED-900 Polyetheramine," Huntsman, Technical Bulletin, 2011, 2 pages.
Huntsman, "Jeffamine ED-2003 Polyetheramine," Huntsman, Technical Bulletin, 2012, 2 pages.
Huntsman, "Jeffamine Polyetheramines," Huntsman, product data sheet, 2016, 11 pages.
Huntsman, "Jeffamine ED-600 Polyetheramine," Huntsman, Technical Bulletin, 2008, 2 pages.
Solvay, "Fluorolink E10H," Solvay, Safety Data Sheet, 2016, 13 pages.
Solvay, "Fluorolink S 10," Solvay, Safety Data Sheet, Oct. 2014, 12 pages.
Solvay, "Fluorolink E10-H Perfluoropolyether," Solvay, Technical Data Sheet, Jul. 2013, 3 pages.
Solvay, "Fluorolink S10 Perfluoropolyether," Solvay, Technical Data Sheet, Jul. 2013, 1 page.
Cray Valley, "Hydrogenated Polybutadiene Monols and Diols as Reactive Intermediates," Cray Vallet, Technical Update, Jul. 2013, 3 pages, retrived from https://www.crayvalley.com/documentation/technical-documents/technical-updates/docs/default-source/technical-update/hydrogenated-krasol-tech-update-final-4-26-13.
Cray Valley, "Hydrogenated Hydroxyl-Terminated Polyolefin," Cray Valley, Technical Data Sheet: KRASOL HLBH-P 2000, 1 page, retrieved from http://crayvalley.com.temppublish.com/docs/TDS/krasol-hlbh-p-2000.pdf on Apr. 26, 2019.
Cray Valley, "Hydrogenated Hydroxyl-Terminated Polyolefin," Cray Valley, Technical Data Sheet: KRASOL HLBH-P 3000, 1 page, retrieved from https://www.crayvalley.com/docs/default-source/tds/krasol-lbh-p-3000.pdf?sfvrsn=514e6c7d_4 on Apr. 26, 2019.
Cray Valley, "KRASOL Hydroxyl Terminated Polybutadiene," Cray Valley, Technical Data Sheet: KRASOL LBH 2000, 1 page, retrieved from http://crayvalley.com.temppublish.com/docs/TDS/krasol-lbh-p-2000.pdf on Apr. 26, 2019.
Cray Valley, "KRASOL Hydroxyl Terminated Polybutadiene," Cray Valley, Technical Data Sheet: KRASOL LBH 3000, 1 page, retrieved from https://www.crayvalley.com/docs/default-source/tds/krasol-lbh-p-3000.pdf?sfvrsn=514e6c7d_4 on Apr. 26, 2019.
Cray Valley, "KRASOL Hydroxyl-Terminated Polybutadiene," Cray Valley, Technical Data Sheet: KRASOL LBH-P 2000, 1 page, retrieved from http://crayvalley.com.temppublish.com/docs/TDS/krasol-lbh-p-2000.pdf on Apr. 26, 2019.
Cray Valley, "KRASOL Hydroxyl-Terminated Polybutadiene," Cray Valley, Technical Data Sheet: KRASOL LBH-P 3000, 1 page, retrived from https://www.crayvalley.com/docs/default-source/tds/krasol-lbh-p-3000.pdf?sfvrsn=514e6c7d_4 on Apr. 26, 2019.
Total, "Krasol LBH-P 2000 Safety Data Sheet," Total, May 2016, 6 pages.
Total, "Krasol HLBH-P 2000 Safety Data Sheet," Total, Jan. 2017, 6 pages.
Total, "Krasol HLBH-P 3000 Safety Data Sheet," Total, Jan. 2017, 6 pages.
Total, "Krasol LBH 2000 Safety Data Sheet," Total, Jan. 2017, 6 pages.
Total, "Krasol LBH 3000 Safety Data Sheet," Total, May 2017, 6 pages.
Total, "Krasol LBH P 3000 Safety Data Sheet," Total, Jan. 2017, 6 pages.
Perstorp, "Capa Polyols Partner for your future needs," Perstorp, 2017, 2 pages, retrieved from https://uk.ravagochemicals.com/wp-content/uploads/2017/07/PERSTORP-CAPA.pdf.
Perstorp, "Capa 2065," Perstorp Winning Formulas, Product data sheet, Mar. 2015, 1 page.
Perstorp, "Capa 2402," Perstorp Winning Formulas, Product data sheet, Nov. 2013, 1 page.
Perstorp, "Capa 3901," Perstorp Winning Formulas, Product data sheet, Jan. 2016, 1 page.
Perstorp, "Capa 8025D," Perstorp Winning Formulas, Product data sheet, Jun. 2016, 1 page.
Perstorp, "Capa 8025E," Perstorp Winning Formulas, Product data sheet, Nov. 2014, 1 page.

(56) References Cited

OTHER PUBLICATIONS

Perstorp, "Capa E30388," Perstorp Winning Formulas, Product data sheet, August 2014, 1 page.
Perstorp, "Capa 80210D," Perstorp Winning Formulas, Product data sheet, June 2016, 1 page.
Perstorp, "Capa, One molecule. Millions of opportunities," Perstorp Winning Formulas Brochure, 12 pages, retrieved from https://perstorp.com/ on Apr. 26, 2019.

* cited by examiner

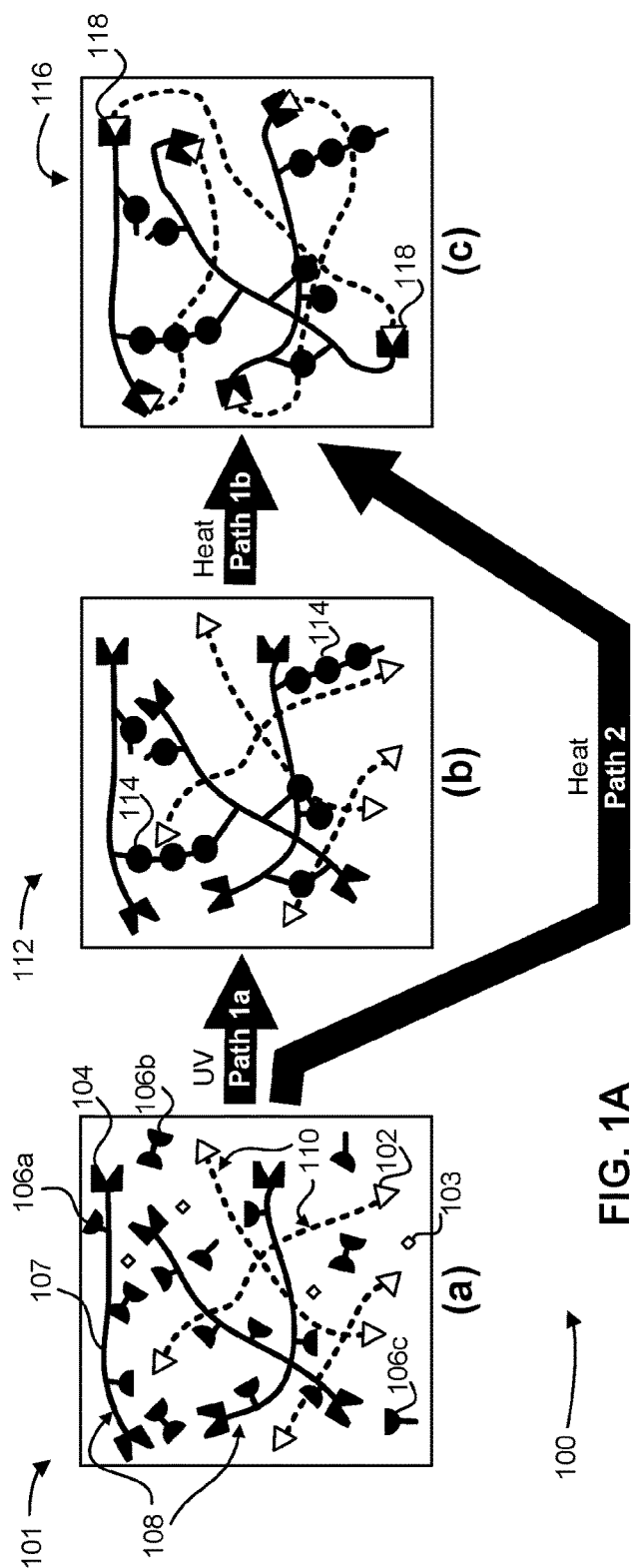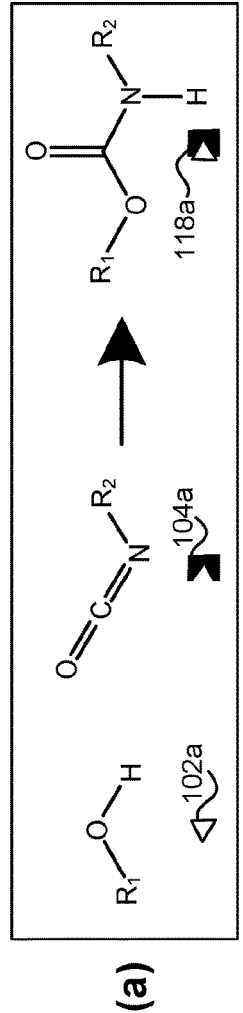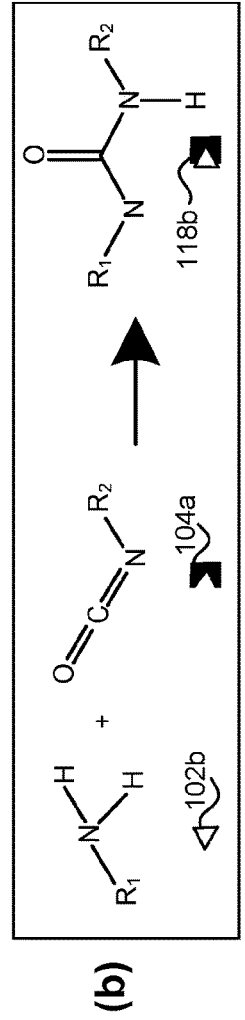
FIG. 1A
FIG. 1B

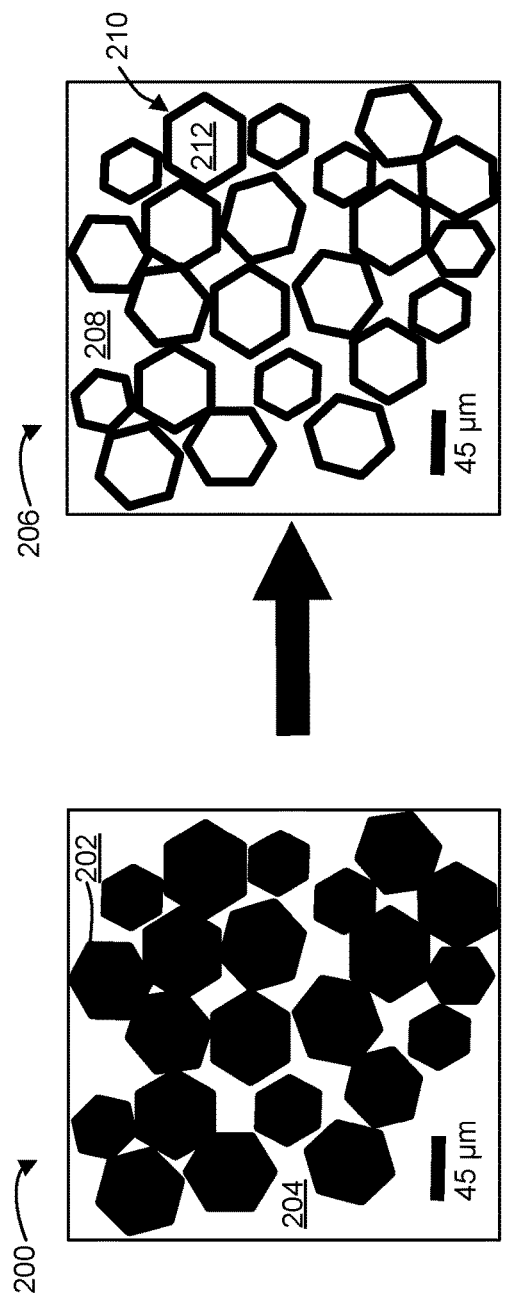
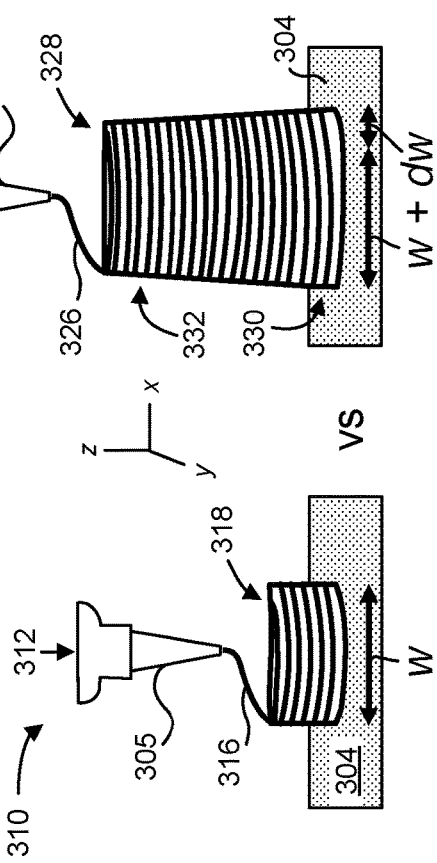
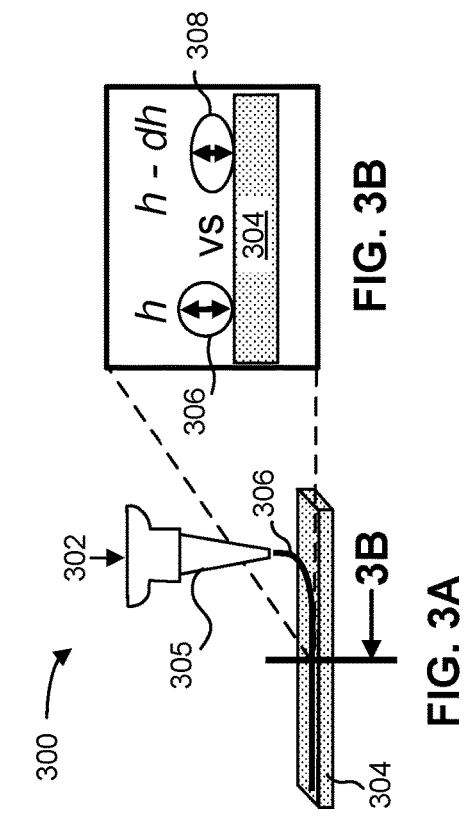
FIG. 2A
FIG. 2B
FIG. 3A
FIG. 3B
FIG. 3C

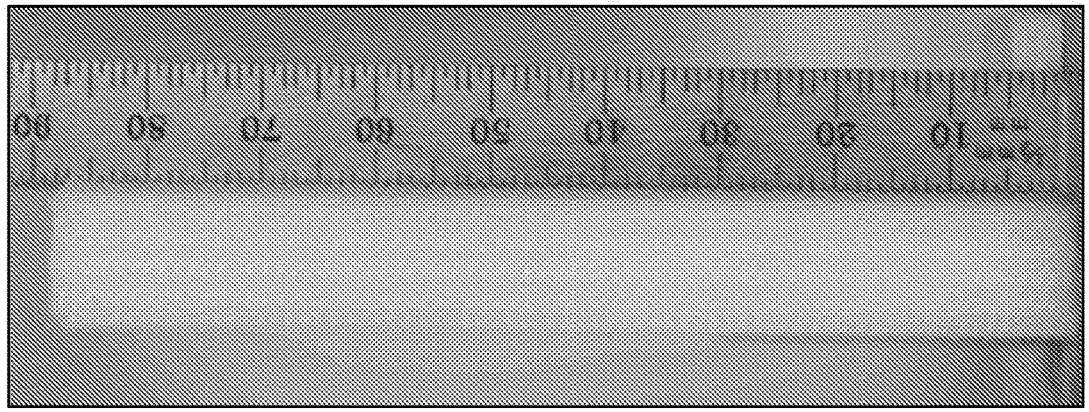
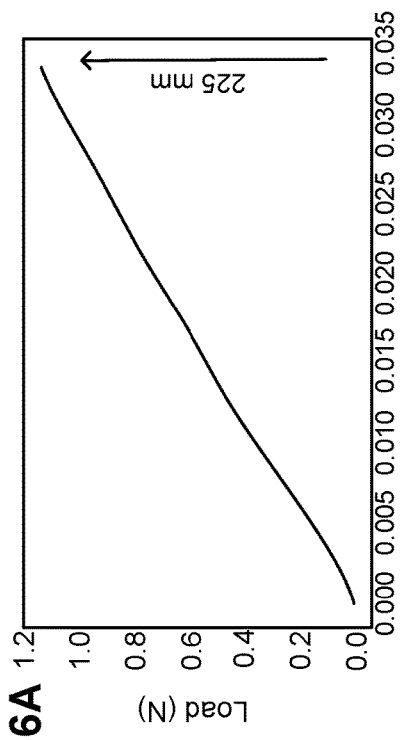
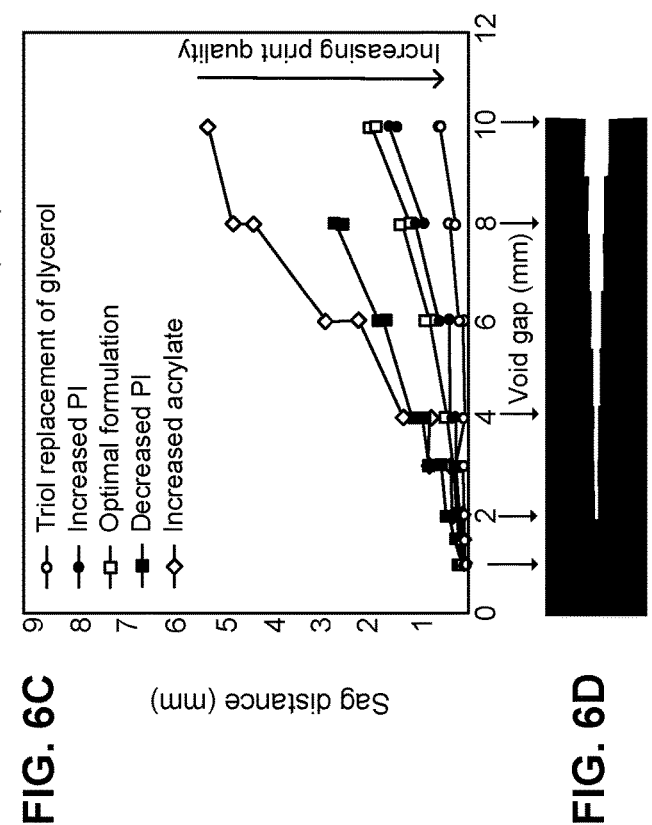
FIG. 6A  FIG. 6B  FIG. 6C  FIG. 6D

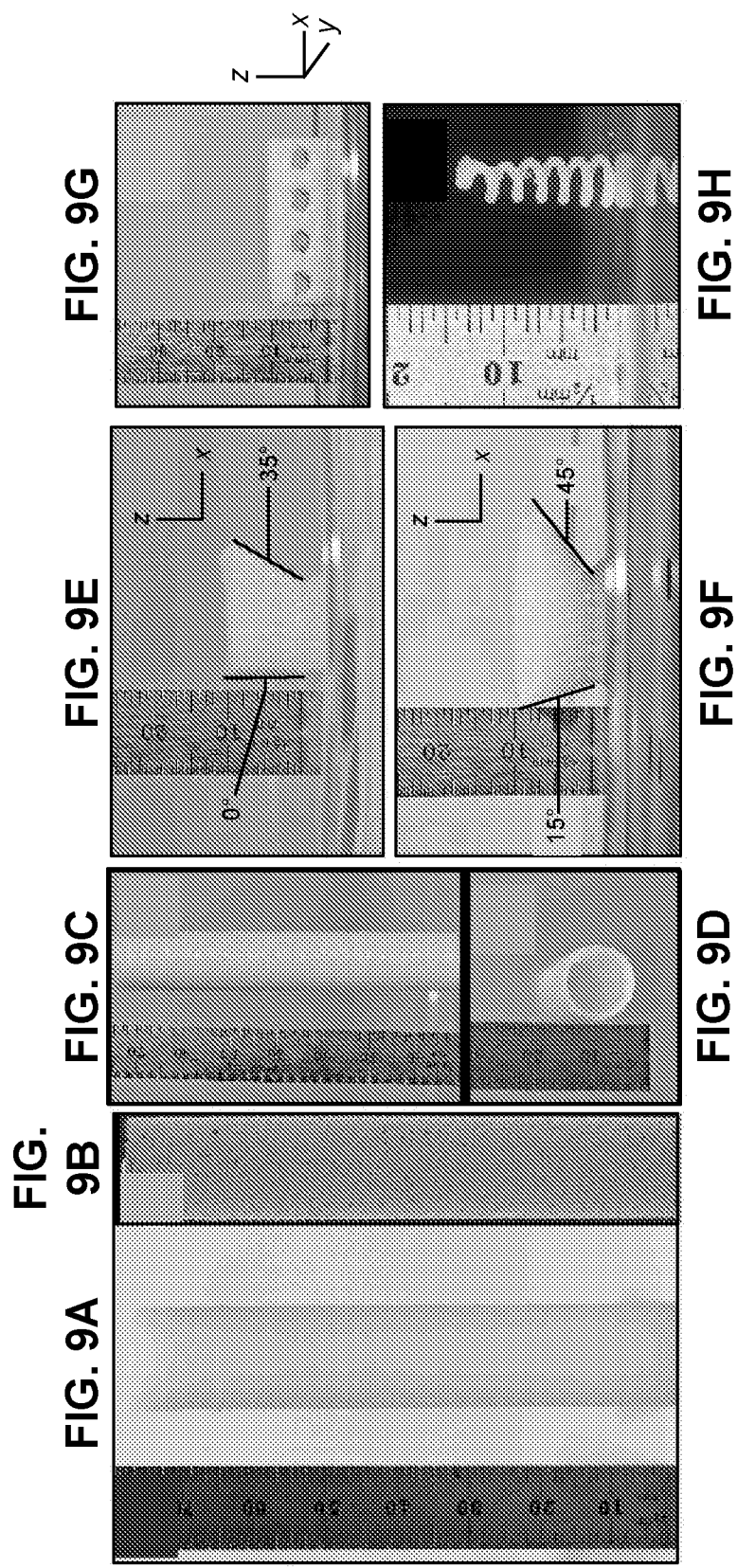

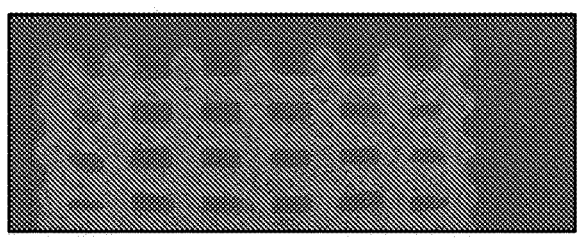
FIG. 11A
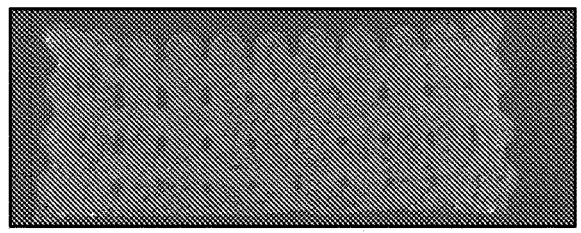
FIG. 11B
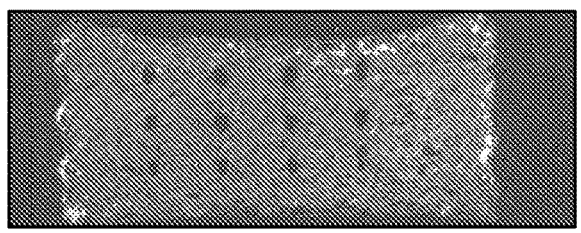
FIG. 11C
FIG. 11D  FIG. 11E
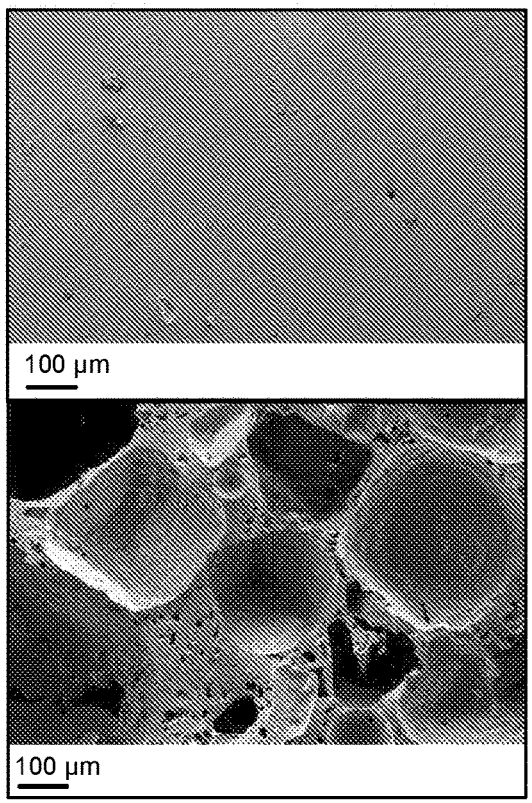
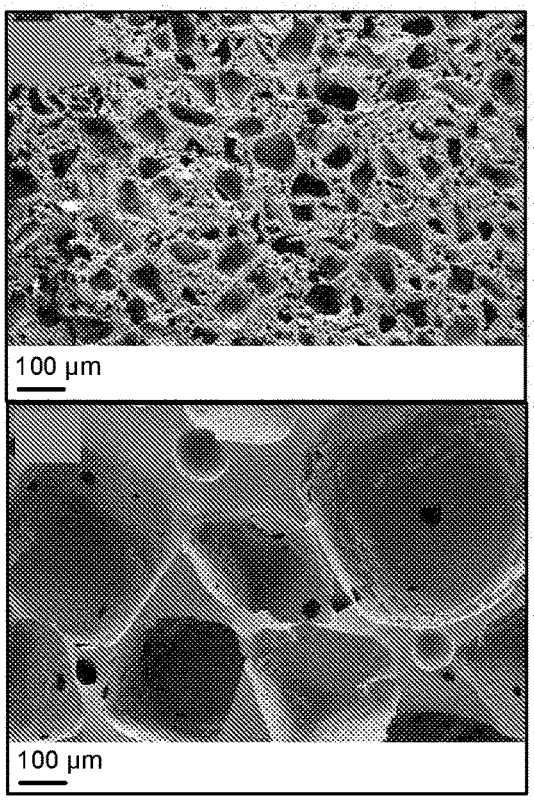
FIG. 11F  FIG. 11G

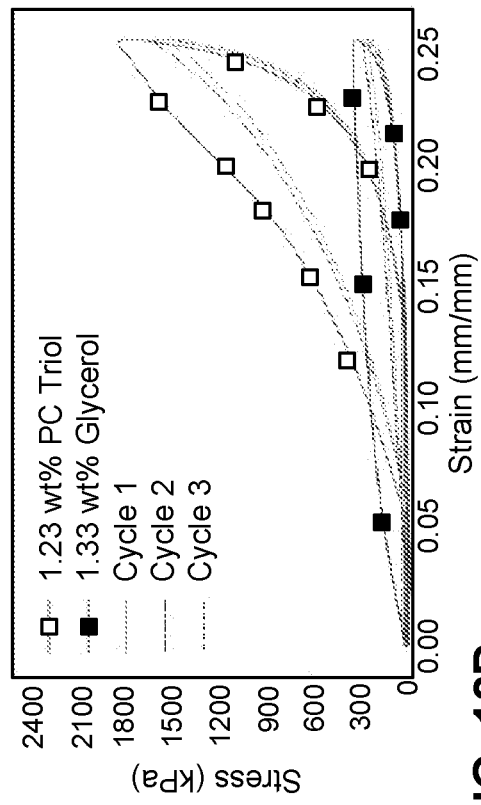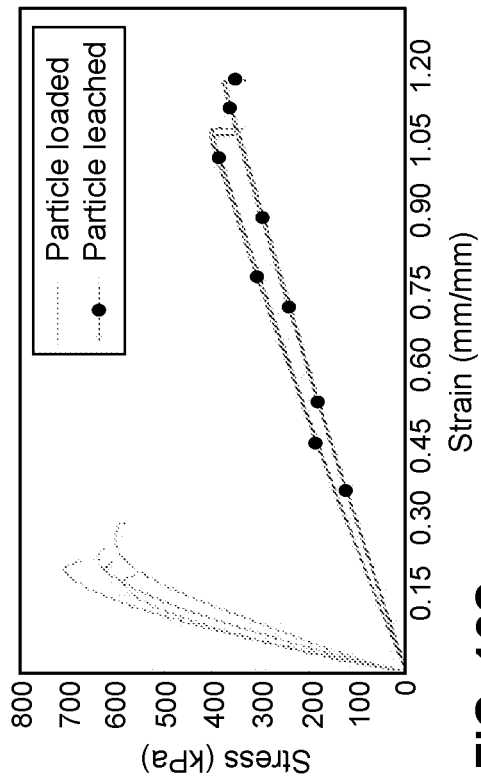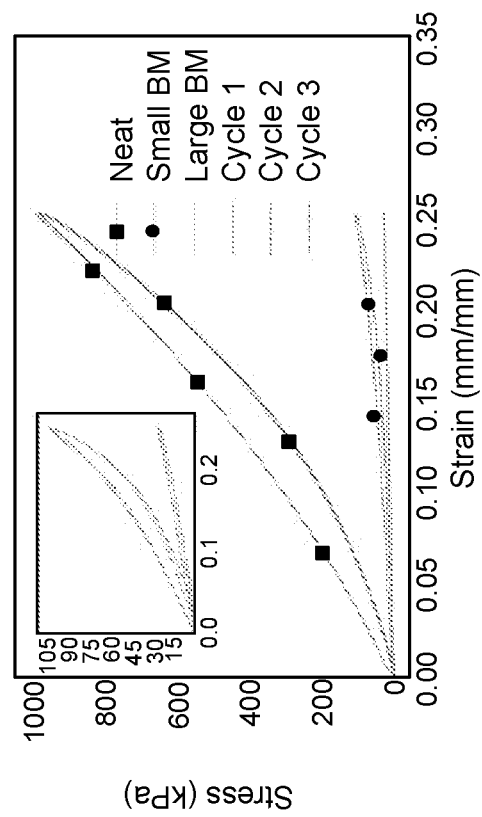

RADIATION-CURABLE, NONRADIATION-CURABLE COPOLYMER SYSTEM FOR ADDITIVE MANUFACTURING

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of elastomer polymer composites, and more particularly, this invention relates to solid-loaded copolymer ink having a radiation-curable pre-polymer and a nonradiation-curable pre-polymer for additive manufacturing of three-dimensional structures.

BACKGROUND

There are significant challenges to additive manufacturing using highly loaded inks to form three-dimensional (3D) structures having exactness and resolution but without the printed structure sagging, collapsing, or otherwise deforming during the print process. Some studies have shown that highly loaded inks having minimal binder and/or solvent may stabilize the structure after solvent evaporation. Other studies have shown additive manufacturing of 3D structures using inks that include polyelectrolyte complexes, colloidal suspensions, polymer or wax melts, and polymers with subsequent gelation. However, these examples of inks are not highly loaded with solids and/or are pure acrylate polymer.

It is desirable to be able to print a three-dimensional structure with an elastomeric ink that does not sag or change dimensionally during extrusion of the ink in multiple layers. Furthermore, it would be desirable to form a three-dimensional structure having these structural characteristics comprising porous material.

SUMMARY

According to one aspect of an inventive concept, an ink includes a nonradiation-curable pre-polymer having at least two nonradiation-curable components per molecule of the nonradiation-curable pre-polymer, a radiation-curable component, a polymer having at least one reactive hydrogen component, and a photoinitiator. A concentration of the nonradiation-curable pre-polymer having at least two non-radiation-curable components is in a range of greater than 0 weight % to less than 99 weight % of a total weight of the ink.

According to another aspect of an inventive concept, a three-dimensional product formed by additive manufacturing, the three-dimensional product includes a plurality of continuous filaments arranged in a geometric pattern, where the plurality of continuous filaments includes a radiation-cured component and a nonradiation-cured component. A concentration of the nonradiation-cured component is in a range of greater than 5 wt % to less than 95 wt % of total weight of the three-dimensional product. The three-dimensional product includes a plurality of non-random pores located between adjacent printed continuous filaments, where an average diameter of the non-random pores is in a range of greater than 0 microns to less than 50 microns. In addition, the three-dimensional product includes a plurality of layers including the plurality of continuous filaments, where a lower layer of the plurality of layers is below an uppermost layer of the plurality of layers, and a dimension of the lower layer is the same as a dimension of the uppermost layer of the plurality of layers at least one continuous filament.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1A is a schematic diagram of paths to cure ink having a radiation-curable component and a nonradiation-curable component, according to several aspects of an inventive concept. Part (a) is a schematic drawing of an ink, according to one aspect of an inventive concept. Part (b) is a schematic drawing of a product having a radiation-cured component. Part (c) is a schematic drawing of a product having a nonradiation-cured component.

FIG. 1B is a schematic diagram of reactions to form a nonradiation-cured component as shown in part (c) of FIG. 1A, according to an inventive concept. Part (a) represents a reaction for forming a urethane linkage, according to one aspect of an inventive concept. Part (b) represents a reaction for forming a urea linkage, according to one aspect of an inventive concept.

FIG. 2A is a schematic drawing of a foam fabrication process, where an ink has solvent soluble particles, according to one aspect of an inventive concept.

FIG. 2B is a schematic drawing of the printed structure of FIG. 2A following solvation of the particles leaving a plurality of voids, according to one aspect of an inventive concept.

FIG. 3A is a schematic drawing depicting sag of a filament profile.

FIG. 3B is a magnified view of the cross-section 3B of the sag of a filament profile in FIG. 3A.

FIG. 3C is a schematic drawing depicting sag of a printed three-dimensional structure.

FIG. 6A is a plot of compression onto a 10 mm×10 mm×5 mm lattice structure from added force to simulate addition of printed layers.

FIG. 6B is an image of a 10 mm×10 mm lattice structure printed in a z-direction to about 90 mm in height.

FIG. 6C is a plot of variations of ink formulations and resulting sag, according to various aspects of an inventive concept.

FIG. 6D is a drawing of the relative void gap at each step tested.

FIG. 9A depict an image of a side view of a solid cylinder having a high aspect ratio, according to one aspect of an inventive concept.

FIG. 9B is an X-ray CT image of solid cylinder of FIG. 9A.

FIG. 9C depicts an image of the side view of a hollow cylinder printed with a single filament, according to one aspect of an inventive concept.

FIG. 9D is a top view of the hollow cylinder formed by a single filament, according to one aspect of an inventive concept.

FIG. 9E is an image of a block structure formed with varying degrees of overhang, 0°, 35°, according to one aspect of an inventive concept.

FIG. 9F is an image of a block structure formed with varying degrees of overhang, 15°, 45°, according to one aspect of an inventive concept.

FIG. 9G is an image of a block structure formed with holes printed thereacross, according to one aspect of an inventive concept.

FIG. 9H is an image of a free-standing helix, according to one aspect of an inventive concept.

FIG. 11A is an X-ray CT image of 40% dense lattice structures, according to one aspect of an inventive concept.

FIG. 11B is an X-ray CT image of 60% dense lattice structures, according to one aspect of an inventive concept.

FIG. 11C is an X-ray CT image of 80% dense lattice structures, according to one aspect of an inventive concept.

FIG. 11D is a scanning electron microscopy (SEM) image of neat material, cast resin sample, according to one aspect of an inventive concept.

FIG. 11E is an SEM image showing porosity from small bimodal distribution of NaCl particles, according to one aspect of an inventive concept.

FIG. 11F is an SEM image showing porosity from large bimodal distribution of NaCl particles, according to one aspect of an inventive concept.

FIG. 11G is an SEM image showing porosity from large monomodal NaCl particles, according to one aspect of an inventive concept.

FIG. 12A depicts a plot of a tensile test between particle leached and particle loaded printed parts, according to one aspect of an inventive concept.

FIG. 12B depicts a plot of compression to 25% strain of glycerol versus PC triol formulation samples loaded with NaCl particles, according to one aspect of an inventive concept.

FIG. 12C depicts a plot of compression to 25% strain on neat, small bimodal and large bimodal-filled samples after the NaCl had been leeched, according to one aspect of an inventive concept.

FIG. 12D depicts a plot of compression to 25% strain on small bimodal porous samples of varying lattice densities, according to one aspect of an inventive concept.

DETAILED DESCRIPTION

Figure 4:
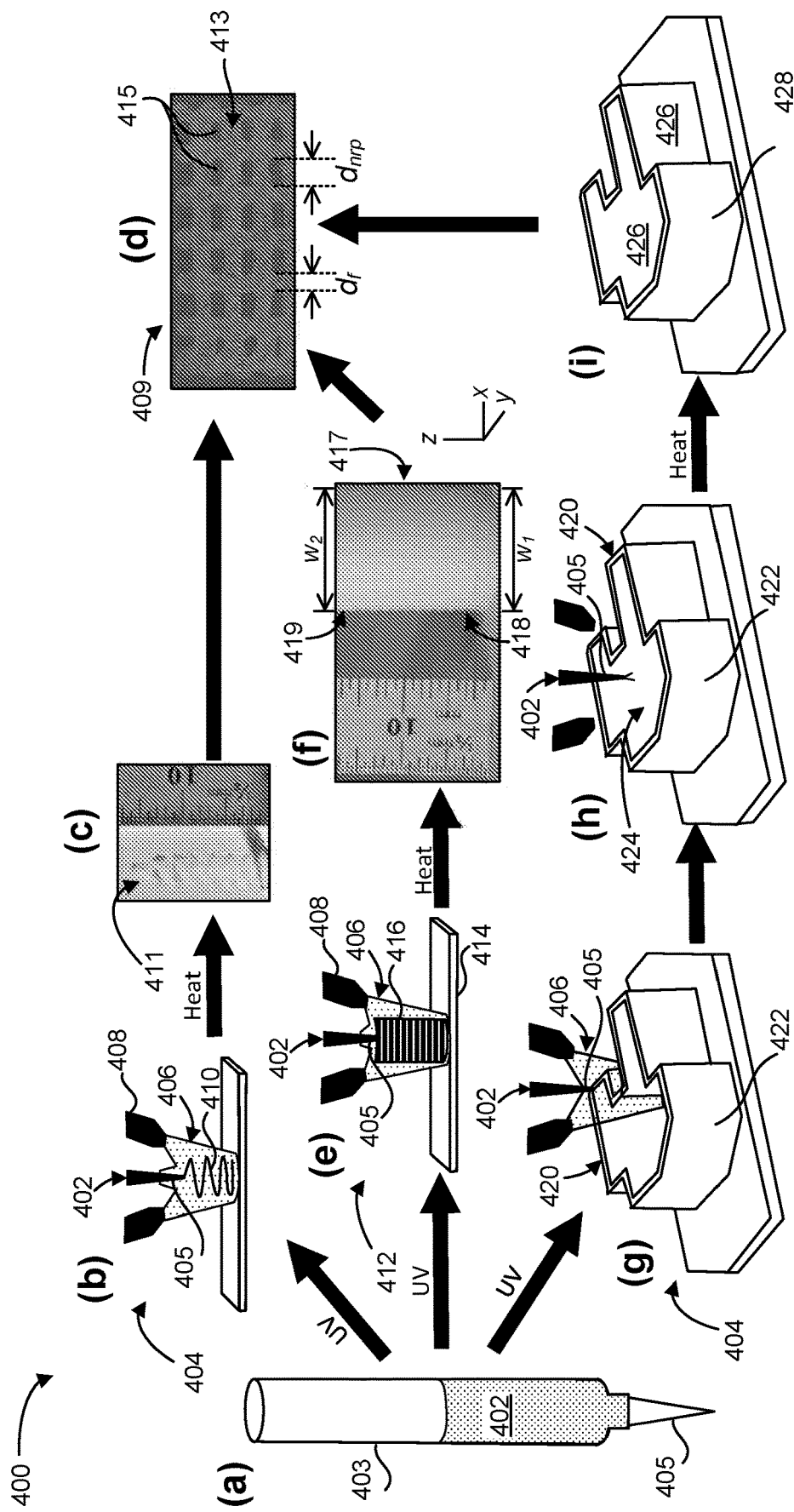
FIG. 4 is a schematic drawing of demonstrated processes of additive manufacturing of an ink loaded with solvable solid, according to various aspects of an inventive concept. Part (a) is a schematic drawing of the ink loaded in an extrusion device, part (b) is a free-form printing process, part (c) is an image of the cured structure formed by the process of part (b). Part (d) is an image of a structure having porosity formed by leaching NaCl particles as described by methods herein. Part (e) is a drawing of a full-density printing process, part (f) is an image of the cured structure formed by the process of part (e). Part (g) is a drawing of the formation of an outer mold of a unique-shaped structure, part (h) is a drawing of the infilling of the outer mold of the unique-shaped structure, and part (i) is a drawing of the cured structure formed in part (h).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component to the total weight of the mixture. Moreover, vol % is defined as the percentage of volume of a particular component to the total volume of the mixture.

The present disclosure describes formation of material with pores of varying sizes. For the purposes of this disclosure, mesoscale pores, also known as mesopores, are defined as having a diameter in a range of about 2 nanometers (nm) to about 50 nm, microscale pores, also known as micropores, are defined as having a diameter in a range of greater than 0 nm to less than about 2 nm Macroscale pores, also known as macropores, are defined as having a size greater than 50 nm. Mesoporosity refers to a characteristic of a material having pores with a diameter of mesoscale. Microporosity refers to a characteristic of a material having pores with diameter of microscale. Macro-periodic porosity refers to a characteristic of a material having pores with diameters of macroscale.

The present disclosure includes several descriptions of exemplary "inks" used in an additive manufacturing process to form the hierarchical architecture described herein. It should be understood that "inks" (and singular forms thereof) may be used interchangeably and refer to a composition of matter such that the composition of matter may be "written," extruded, printed, or otherwise deposited to form a layer that substantially retains its as-deposited geometry and shape without excessive sagging, slumping, squishing, dimensionally changing, other deformation, etc. even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred inventive concepts of three-dimensional hierarchically porous elastomers and/or related systems and methods.

According to one general aspect of an inventive concept, an ink includes a nonradiation-curable pre-polymer having at least two nonradiation-curable components per molecule of the nonradiation-curable pre-polymer, a radiation-curable component, a polymer having at least one reactive hydrogen component, and a photoinitiator. A concentration of the nonradiation-curable pre-polymer having at least two nonradiation-curable components is in a range of greater than 0 weight % to less than 99 weight % of a total weight of the ink.

According to another general aspect of an inventive concept, a three-dimensional product formed by additive manufacturing, the three-dimensional product includes a plurality of continuous filaments arranged in a geometric pattern, where the plurality of continuous filaments includes a radiation-cured component and a nonradiation-cured component. A concentration of the nonradiation-cured component is in a range of greater than 5 wt % to less than 95 wt % of total weight of the three-dimensional product. The three-dimensional product includes a plurality of non-random pores located between adjacent printed continuous filaments, where an average diameter of the non-random pores is in a range of greater than 0 microns to less than 50 microns. In addition, the three-dimensional product includes a plurality of layers including the plurality of continuous filaments, where a lower layer of the plurality of layers is below an uppermost layer of the plurality of layers, and a dimension of the lower layer is the same as a dimension of the uppermost layer of the plurality of layers. at least one continuous filament.

According to a general aspect of an inventive concept, an ink includes a nonradiation-curable pre-polymer having at least two nonradiation-curable components per molecule of the nonradiation-curable pre-polymer, a radiation-curable component, a polymer having at least one reactive hydrogen component, and a photoinitiator.

According to another general aspect of an inventive concept, a three-dimensional product formed by additive manufacturing, the three-dimensional product includes at least one continuous filament arranged in a geometric pattern, where the at least one continuous filament is unsupported. Moreover, the at least one continuous filament includes a radiation-cured component and a nonradiation-cured component.

A list of acronyms used in the description is provided below.

| 3D | Three-dimensional |
|---|---|
| AM | Additive manufacturing |
| C | Celsius |
| CT | Computed tomography |
| cm | centimeter |
| DIW | Direct Ink Writing |
| h | hours |
| mm | millimeter |
| NaCl | Sodium chloride |
| nm | nanometer |
| Pa | Pascals |
| PCL | polycaprolactone |
| s | seconds |
| SEM | Scanning electron microscopy |
| SF | Standard formulation |
| μm | micron |
| UGAP | urethane grafted acrylate polymer |
| UV | Ultraviolet |
| vol % | volume percent |
| wt % | weight percent |

According to an inventive concept, an uncured-polymeric resins may be used as feed stock "inks" for all extrusion, deposition, resin-bath extraction and yet to be developed additive manufacturing methods. The uncured polymeric resins afford highly tunable print properties through a combination of a radiation curable resin fraction and a nonradiation curable resin fraction that may be crosslinked through a bifunctional linker common to each polymer type. These ink formulations allow for rapid in situ stiffening of the resin during deposition via radiation (UV light or electron beam), holding the deposited filaments in place. A secondary thermal or time delay cure is then performed post print fully curing the resin/composite to its final usable state. The material properties and therefore end use of the printed part is highly tunable by changing; radiation curing polymer type and/or chemistry, thermal/latent curing polymer type and/or chemistry, ratio of the radiation to thermal/latent curing polymers, type, size, quantity of solid fillers, method of, and order of, curing steps, printing with or without in situ radiation, and post processing of printed part to; remove porogen-solids, thermally remove resin and sinter remaining patterned solids, and exchange solids or chemically react solids or chemical moieties within the resin.

According to various inventive concepts, a grafted copolymer system may include an ink having a radiation-curable component and a nonradiation curable component during an additive manufacturing process to form a supported printed 3D structure. In one approach, an ink includes acrylate and urethane components that can be partially cured with UV-induced chemistry during the 3D printing process to form a supported printed structure. In some approaches, the polymer system is a urethane grafted acrylate co-polymer (UGAP). In various approaches, UGAP allows printing of inks highly loaded with solids that may be referred to as highly solids loaded inks. The resulting structure does not demonstrate sagging, squishing, collapsing, dimensionally changing, etc. during 3D printing because UV-light induced chemistry during printing stabilizes the part as the part is printed. In some approaches, the structure may be printed without being limited to a yield stress point.

Upon completion of printing, with concurrent UV-irradiated cure, in some approaches a thermal curing step may fully cure the printed part.

In some approaches, the UGAP-based ink may be solids loaded up to a sufficient rheology to allow extrusion using additive manufacturing extrusion-based techniques. In one approach, in-situ curing by UV-irradiation may allow extruded filaments to be self-supporting throughout the entire print.

In one approach, a UGAP-polymer resin may be loaded with as little or as much solid as desired as long as the composite ink is still printable through extrusion. In one approach, fine solids such nanoclay, graphene, or fumed silica may be added to the ink to reinforce the mechanical properties of the UGAP. In one approach, inorganic or metallic solids may be added to the ink such that a post-thermal treatment step results in formation of a carbonized structure and/or removes the UGAP portion from the printed structure, followed by a sintering step to set the solids into a rigid structure. In one approach, solvable solids may be added to the ink thereby allowing post-printing (e.g., post-processing) extraction of the solids through leaching and thereby producing a cellular foam. In one approach, reactive materials (e.g., explosives, thermites, etc.) may be added to the ink to form a printed structure that includes reactive materials.

In various approaches, a primary UV-curing step also allows 3D Direct Ink Write (DIW) extrusion-based printing without affecting the mechanical properties and density of the resulting structure. In one approach, the primary UV-cure step of extruding resin ink allows printing a rigid mold that may be infilled by the same resin ink without UV-curing, thereby allowing the newly printed rigid mold to be completely infilled, and then the resultant structure may be thermally cured to final homogenous cured solid structure having an outer shape corresponding to the UV-cured rigid structure.

In one approach, the extrusion-based ink formulation may be used for bottom up processes. Advantages of the extrusion-based ink as described herein include: a) unlimited print scales, b) high solids loading, c) elastomeric resin with tunable properties, d) rapid optimization, e) rapid tunable gelation and/or curing using multiple pathways, and f) solvent permeable or otherwise post-processable composite with leachable solids resulting in an elastomeric foam.

In conventional approaches, high solids loading tends to limit optimal ink rheology for extrusion-based printing, and promotes yield stress in the resultant printed part such that sagging, slumping, etc. will cause the part to differ from the desired structure. However, a fully UV-curable polymer ink results in a rigid cured structure without elastomeric properties. Thus, as described herein, a resin ink having curing rate that may be controlled during extrusion of the ink may allow formation of an elastomeric 3D structure without yield stress. In one approach, an ink that includes a UV-curable resin having acrylates grafted onto an elastomeric polyurethane forms a 3D printed structure with tunability, elastomeric properties, and dimensional stability.

FIG. 1A shows a method 100 for additive manufacturing with an ink having a radiation-curable component and a nonradiation-curable component, in accordance with one aspect of the inventive concepts described herein. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative aspects listed herein. Further, the methods presented herein may be carried out in any desired environment. Moreover, greater or fewer operations than those shown in FIG. 1A may be included in method 100, according to various aspects of inventive concepts described herein. It should also be noted that any of the aforementioned features may be used in any of the aspects described in accordance with the various methods.

According to one inventive concept, as shown in part (a) of FIG. 1A, an ink 101 includes a nonradiation-curable pre-polymer 108 having at least two nonradiation-curable components 104 per molecule of the nonradiation-curable pre-polymer 108, a radiation-curable component 106a, 106b, 106c, a polymer 110 having at least one reactive hydrogen component 102, and a photoinitiator 103. In one approach, at least two nonradiation-curable components 104 may be linked by a linker 107. In one approach, the linker 107 (e.g., backbone, connector molecule, etc.) may be positioned between the at least two nonradiation-curable components 104 of the nonradiation-curable pre-polymer 108. In one approach, the nonradiation-curable components may be coupled to the linker. In one approach, the nonradiation-curable components may be adjacent to each other on a linker.

For example, and not meant to be limiting, in one approach, an isocyanate compound may include a linker linking the isocyanate components in each compound.

In various approaches, each component of the ink formulation may be a liquid. Further, in one approach, the ink formulation may not include a solvent. In another approach, the ink formulation may include a solvent.

In some approaches, the ink 101 may include different forms of radiation-curable components 106a, 106b, 106c. In one approach, the ink 101 may include a molecule having multiple radiation-curable components 106b. In one approach, the ink 101 may include free (e.g., uncoupled, unattached, not bonded, etc.) radiation-curable components 106c.

In one approach, at least one radiation-curable component 106a may be coupled to the linker 107. In one approach, the radiation-curable component 106a may be coupled to the linker 107 positioned between the at least two nonradiation-curable components 104 of the nonradiation-curable pre-polymer 108. In one approach, the radiation-curable component may be coupled to the linker positioned adjacent to the at least two nonradiation-curable components of the nonradiation-curable pre-polymer. In one approach, at least one radiation-curable component 106a, 106b, 106c includes an acrylate component. For example, and not meant to be limiting, in one approach, an isocyanate-acrylate compound may include a linker linking the isocyanate components in each compound, where at least one of the acrylate components are coupled to the linkers.

In various approaches, the concentration of the radiation-curable component in the ink is inverse to the concentration of the at least two nonradiation-curable components. For example, ratio of the concentration of radiation-curable component to the concentration of at least two nonradiation curable components may be 5:95, 10:90, 20:80, 30:70, 40:60, 50:50, 60:40, 70:30, 80:20, 90:10, etc. In various approaches, the increasing ratio of the concentration of radiation-curable component to the concentration of nonradiation-curable components may be defined by the desired glassiness of the printed product. Alternatively, decreasing concentration of radiation-curable component to increasing concentration of nonradiation-curable component may be defined by desired elastomeric properties of the printed product.

In one approach, a concentration of the radiation-curable component may be in a range of greater than 0 wt % to less than 99 wt % of weight of total ink less the photoinitiator and chemical component present to form the nonradiation-cured component (e.g., polyol, amine, etc.). In one approach, a concentration of the radiation-curable component may be in a range of greater than 5 wt % to less than 50 wt % of weight of total ink. In another approach, a concentration of the radiation-curable component may be in a range of greater than 5% to less than 40 wt % of weight of total ink. In yet another approach, a concentration of the radiation-curable component may be in a range of greater than 15 wt % to less than 35 wt % of weight of total ink. In yet another approach, a concentration of the radiation-curable component may be in a range of greater than 5 wt % to less 30 wt % of weight of total ink.

In preferred approaches, the concentration of the radiation-curable component in the ink is an effective concentration for rapid stiffening of the extruded filaments during radiation exposure for a defined application of the ink for additive manufacturing. For example, in preferred approaches, a concentration of radiation-curable component in the ink formulation is in a range of greater than 0 wt % to less than 15 wt % of the total weight of the ink. In an exemplary approach, the concentration of radiation-curable component in the ink formulation is in a range of greater than 0 wt % and 5 wt % or less of total weight of the ink formulation.

In one approach, the radiation curable component may include an acrylate. For example, and not meant to be limiting, an acrylate may include 1-6, hexane diol diacrylate, ethylene glycol phenoxyethyl acrylate (PEA), poly(ethylene glycol) diacrylate, etc.

In one approach, the radiation-curable component may include a thiol-ene. For example, and not meant to be limiting, a thiol-ene may include primary dithiols such as 1,2-ethanedithiol, benzene-1,4-dithiol, poly(ethylene glycol) dithiol, etc., and alkenes such as 1,9-decane diene, vinyl acetate, unsaturated 1,2- and 1,4-polybutadiene, etc.

In another approach, the radiation-curable component may include an epoxy component. For example, and not meant to be limiting, the epoxy component may include 1,2-epoxy hexane, 1,2-epoxy-3-phenoxypropane, bisphenol A diglycidyl ether, poly(bisphenol A-co-epichlorohydrin), glycidyl end-capped, etc. In some approaches, the epoxy component may be cured through a cationic UV-catalyst.

In yet another approach, the radiation-curable component may include a vinyl component. For example, and not meant to be limiting, the vinyl component may include styrene, vinyl acetate, unsaturated 1,2- and 1,4-polybutadiene, etc. In various approaches, the radiation-curable component may include a combination of different radiation-curable components.

In one approach the acrylate in the ink formulation may be comprised of di-function monomeric diacrylates (1-6, hexane diol diacrylate, bisphenol A ethoxylate diacrylate, tetra(ethylene glycol) diacrylate, pentaerythritol diacrylate monostearate, etc.), mono-functional acrylates (ethylene glycol phenoxyethyl acrylate (PEA), isobornyl acrylate, butyl acrylate, tetrahydrofurfuryl acrylate, etc.), and mixtures of such soluble mono- and di-functional acrylates. Additionally, in some approaches, oligomeric mono- and di-functional acrylates may be included (poly(ethylene glycol) diacrylate, poly(propylene glycol) diacrylate, poly(ethylene glycol) methyl ether acrylate, poly(L-lactide)-acrylate terminated, methacrylate terminated polydimethylsiloxanes, etc.).

In various approaches, the functional acrylates being monomeric or oligomeric may have any chemical make-up and any molecular weight so long as the final composition of all ink ingredients result in an extrudable material. Examples include, individual or mixtures of acrylate monomers, acrylate monomers blended with liquid acrylate oligomers, solid acrylate oligomers dissolved in acrylate monomers, mixtures of solid acrylate oligomers dissolved in non-participating plasticizers or solvents, etc. In one approach, the curing rate of the composition may be defined by a combination of mono- and di-acrylates used in the ink. In one approach, the final material properties of the printed part from the composition may be defined by the combination of mono- and di-acrylate used in the ink.

In one approach, a concentration of the nonradiation-curable pre-polymer having at least two nonradiation curable components may be in a range of greater than 0 wt % to less than 99 wt % of the weight of total ink less the photoinitiator and chemical component present to form the nonradiation-cured (e.g., polyol, amine, isocyanates. etc.). In another approach, a concentration of the nonradiation-curable pre-polymer having at least two nonradiation-curable components may be in a range of greater than 0 wt % to less than 95 wt % of the weight of the total ink. In one approach, a concentration of the nonradiation-curable pre-polymer having at least two nonradiation-curable components may include equal amounts of the nonradiation-curable pre-polymer and the polymer having a reactive hydrogen component. In some approaches, a ratio of the nonradiation curable component of the nonradiation-curable pre-polymer to the reactive hydrogen component of the polymer having a reactive hydrogen component may be at least 1:1. For example, and not meant to be limiting, an ink may include an isocyanate pre-polymer having a ratio of isocyanate component to hydroxyl components of a polyol of 1:1, wherein an ink having 94 wt % isocyanate pre-polymer may include 52 wt % isocyanate component and 52 wt % hydroxyl component of polyol of weight of total ink.

As described above, the ratio of the concentration of radiation-curable component to the concentration of the nonradiation-curable prepolymer having at least two nonradiation-curable components may be in a range of greater than 1:99 to less than 99:1 of the total ink less the additives in the ink (e.g., photoinitiator, components for nonradiation cured components, solid additive etc.).

In various approaches, at least one of the at least two nonradiation-curable components 104 of the nonradiation-curable pre-polymer 108 may include an isocyanate component. In various approaches, a concentration of the non-radiation-curable pre-polymer of the total ink includes the nonradiation-curable pre-polymer and the polymer having a reactive hydrogen component. In one approach, a concentration of the isocyanate component may be in a range of greater than 0 wt % to less than 99 wt % of weight of total ink. In another approach, a concentration of the isocyanate component may be in a range of greater than 5 wt % to less than 97 wt % of weight of total ink. In one approach, a concentration of the isocyanate component may be in a range of greater than 10 wt % to less than 95 wt % of weight of total ink. In yet another approach, a concentration of the isocyanate component may be in a range of greater than 20 wt % to less than 90 wt % of weight of total ink. In yet another approach, a concentration of the isocyanate component may be in a range of greater than 30 wt % to less than 80 wt % of weight of total ink.

In one approach, the nonradiation-curable pre-polymer 108 includes a nonradiation-curable component 104 and a radiation-curable component 106a. In one approach, the nonradiation-curable pre-polymer 108 is a compound of the ink 101 having a mixture of at least two nonradiation-curable components 104 and at least one radiation-curable component 106a.

For example, and not meant to be limiting, an isocyanate-acrylate compound is a mixture of two components, an isocyanate component and an acrylate component. In one approach, the isocyanate component may include one of the following: an oligomeric isocyanate, a monomeric isocyanate, etc. In one approach, the isocyanate component may include one of the following: methylene diphenol 4, 4' diisocyanate, isophorone diisocyanate, and hexamethylene diisocyanate.

In one approach, the compound of the nonradiation-curable pre polymer 108 having the radiation-curable component 106a is a molecule. In preferred approaches, the isocyanate-acrylate compound includes isocyanate components and acrylate components that are chemically linked to each other. Without wishing to be bound by any theory, it is believed that chemically linking the two different polymer phases may minimize a phase separation over time, e.g., temperatures changes, humidity changes, etc.

In various approaches, the nonradiation-curable pre-polymer 108 may be involved in a curing mechanism that includes the nonradiation-curable component 104 and a reactive hydrogen component 102. For example, Path 1b and Path 2 of FIG. 1A describe a nonradiation curing pathway, e.g., heat, time duration, etc. that may include the reactions as shown in FIG. 1B.

In one approach, as shown in part (a) of FIG. 1B, an alcohol 102a and isocyanate 104a form a carbamate (commonly known as urethane 118a). In another approach, as shown in part (b) of FIG. 1B, an amine 102b and isocyanate 104a form a urea 118b linkage. In yet other approaches, an organic acid (RCOOH) and an isocyanate form an amide linkage with the loss of $CO_2$. However, organic acids tend to be more reactive and less stable compared to alcohol and amine components.

In various approaches, a concentration of the polymer 110 having at least one reactive hydrogen component 102 in the ink 101 correlates to the concentration of a reactive hydrogen components 102 where a ratio of a reactive hydrogen component 102 to a nonradiation-curable component 104 is at least 1:1.

In one approach, the polymer 110 having at least one reactive hydrogen component 102 may be a polyol. As shown in FIG. 1B, part (a), in one approach, at least one reactive hydrogen component may be an alcohol component 102a, where the isocyanate component 104 and the alcohol component 102a may form a urethane 118a linkage.

In one approach, the polyol includes at least one alcohol component. In some approaches, the ratio of alcohol components in the ink to isocyanate components in the ink may be at least 1:1.

In one approach, polyol includes a diol. In some approaches, the polyol may include both a diol component and a polyalcohol component having the chemical formula $R(OH)_n$ where n>1 to increase crosslinking. In various approaches, the ratio of the diol component to the polyalcohol component may be greater than 1:1. In one approach, the ratio of the diol component to the polyalcohol component may be greater than 2:1. In various approaches, the ratio of the diol component to the polyalcohol component may be greater than 3:1, 4:1, 5:1, etc. In one approach, the polyalcohol component may be a triol.

In some approaches, a polyol may be a monomeric, oligomeric, etc. alcohol that has two or more functional hydroxyl components. For example, and not meant to be limiting in any way, a polyol may be a polycaprolactone, a hydroxy terminated polybutadiene, etc. Examples of di- and tri-functional polyols include (polycaprolactone polyols, saturated and unsaturated hydroxy-terminated polybutadiene, hydroxy-terminated polyethers, hydroxy-terminated epoxy resins and others, at various molecular weights). The ratio of di- and tri-functional polyol control the crosslink density and the mechanical properties of the polymer.

In another approach, the polymer 110 having at least one reactive hydrogen component 102 may be a polyamine. As shown in FIG. 1B, part (b), in one approach, at least one reactive hydrogen component may be an amine component 102b, where the isocyanate component 104a and the amine component 102b may form a urea 118b linkage.

In another approach, the polyamine may include at least one amine component 102b. In some approaches, the ratio of amine components 102b in the ink 101 to isocyanate components 104a in the ink 101 may be at least 1:1.

In some approaches, the polyamine may include 1,6-hexane diamine, linear or branched di-functional and multi-functional polyethyleneimine, trimethylolpropane tris[poly (propylene glycol), amine terminated] ether, etc.

In various approaches, the concentration of the photoinitiator is at an effective concentration for in-situ curing by UV-irradiation during extrusion of the ink. In various approaches, the concentration of the photoinitiator is at an effective concentration to absorb photons and decompose into radicals to start the free-radical polymerization of the radiation-curable component, e.g., acrylate. In one approach, the ink 101 includes a photoinitiator 103 having a concentration greater than about 0.1 weight % (wt %) of weight of total ink 101. In some approaches, a photoinitiator may have a concentration of greater than 1.0 wt % of the total ink. In some approaches, a photoinitiator may have a concentration of greater than 1.5 wt % of the total ink. In some approaches, a photoinitiator may have a concentration greater than 2.0 wt % of the ink.

In one approach, the ink 101 may be cured following a two-step process as shown in parts (b) and (c) of FIG. 1A with Cure Path 1a and Cure Path 1b. The first cure as shown in part (b) of FIG. 1A may include UV-irradiation of the ink 101 to form a first-cured product, e.g., a product having a product having radiation-cured components 112. The first cure may include UV-irradiation of the ink 101 thereby causing the formation of polymers having radiation-cured components 114 by UV-induced polymerization of the radiation-curable components 106a, 106b, 106c in the ink 101. Free radiation-curable components 106b, 106c in the form of single radiation-curable component 106c or a composite of multiple radiation-curable components 106b may polymerize with radiation-curable components 106a associated with the nonradiation-curable pre-polymer 108 thereby forming polymers having radiation-cured components 114 associated with the nonradiation-curable pre-polymer 108. Radiation-curable components 106a associated with the nonradiation-curable pre-polymer 108 may polymerize with neighboring radiation-curable components 106a associated with neighboring nonradiation-curable pre-polymer 108 to form polymers having radiation-cured components 114 across neighboring nonradiation-curable pre-polymers 108 of the product having radiation-cured components 112. In various approaches, radical polymerization of the radiation-curable components 106a, 106b, 106c may be initiated with a selected photoinitiator 103 of the ink 101.

Cure Path 1b of the two step process include applying nonradiation curing step, e.g., thermal treatment, time duration, etc., to the product having radiation-cured components 112 to from a product having radiation-cured components and nonradiation-cured components 116 as shown in part (c) of FIG. 1A.

For example, and not meant to be limiting, in some approaches, the isocyanate-acrylate compound may be a bifunctional crosslinker with isocyanate and acrylate, with alcohol and acrylate, with amine and acrylate, with any combination thereof, etc. that allows grafting the two prepolymers. In one approach, the two pre-polymers of the compound may include a radiation curable pre-polymer. For example, and not meant to be limiting, acrylate components where a chemical polymerization reaction may be initiated by UV light with a radical photoinitiator. The compound may also include a second pre-polymer having different chemistry where the pre-polymer components may be thermally cured or latent time-cured with or without a catalyst. For example, and not meant to be limiting, alcohol/isocyanate components may not hinder the acrylate polymerization chemistry and undergo polymerization after the radiation cure step without deleterious effects on either polymerization (e.g. cure) chemistry.

In one approach, thermal treatment may cause the formation of urethane 118a linkage (as shown in part (a) of FIG. 1B) from an alcohol component 102a of the polyol and the isocyanate component 104a of the radiation-cured isocyanate-acrylate compound having acrylate polymers as illustrated in the product having radiation-cured components 112, part (b) of FIG. 1A.

In some approaches, the ink 101 may form the fully cured product having radiation-cured components and nonradiation-cured components 116 via Cure Path 2 which includes a single step of curing, e.g., thermal treatment, time duration, etc. such that the ink 101 of part (a) may be fully cured in one step to form a fully cured product having radiation-cured components and nonradiation-cured components 116 of part (c).

In various approaches, thermally formed radicals may allow the fully cured product having radiation-cured components and nonradiation-cured components 116, e.g., a urethane polymer resin, to be cured in one (e.g., Cure Path 2) or two steps (e.g., Cure Path 1a and 1b). In one approach, a thermal radical generator may be included in the ink.

In one approach, printing of ink 101 by extrusion through a nozzle, e.g., direct ink writing techniques, may include in-situ UV-curing (Cure Path 1a) of the radiation-curable components to rapidly stiffen the filaments in the extruded ink. A subsequent second curing, e.g., thermal treatment (Cure Path 1b) may fully cure the nonradiation-curable component to a nonradiation cured linkage 118, e.g., urethane 118a linkage, as shown in part (c) of FIG. 1A. In another approach, printing the ink 101 by extrusion through a nozzle may include only a single curing step, e.g., thermal treatment, as illustrated in Cure Path 2 to form a fully cured linkage 118, as shown in part (c) of FIG. 1A. The ink used in Cure Path 2 may not include photoinitiator. The formulation presented here may result in very little difference in the mechanical properties of the ink cured with a single step (Cure Path 2) or two step (Cure Path 1a and 1b) process.

In some approaches, the composition of the ink and Cure Path may depend on the application of the printed product. In one approach where the product is preferred to be more glassy than elastomeric, the ink formulation may include more radiation-curable components (e.g., acrylate components) such that the first cure of UV irradiated forms a printed product having an increased glassy composition, but also may have some elastomeric properties from a second thermal cure. In one approach where the product is preferred to be more elastomeric than glassy, the ink formulation may include more nonradiation-curable components (e.g., to form urethane linkages) for the second cure of applying thermal treatment to form a more elastomeric printed product, but also may have glass-like properties from the first cure involving UV radiation.

In various approaches, the ink may include a solid. In some approaches, the ink may include a porogen. In some approaches, the solid may be solvable, where the solid may be configured to be removed post processing of the printed part using the ink having a solvable solid.

In one approach, as shown in FIG. 2A, the ink 200 may include a solvable solid 202. In one approach, the ink may include a material 204 (e.g., resin) having a soft segment of a nonradiation-cured product (e.g., urethane, urea, etc.) that is water permeable such that the resulting cured composite comprising a solvable solid 202 may be soaked in water to dissolve the solvable solid 202 from the cured composite.

In one approach, as shown in FIG. 2B, the solvable solid 202 may be removed from the cured printed part 206 comprised of a material having radiation-cured components and nonradiation-cured components 208. For example, and not meant to be limiting in any way, in one approach, the solvable solid 202 may include sodium chloride particles. Soaking the cured printed part in water may dissolve the sodium chloride particles from the cured printed part, but not dissolving the material having radiation-cured components and nonradiation-cured components 208, e.g., UGAP material. In one approach, removal of the solvable solid may result in a void 212 in the material having radiation-cured components and nonradiation-cured components 208, e.g., UGAP material, where the solvable solid particle 202 resided in the printed part before solvation. The printed part 206 may include pores 210 that pattern according to the positions of the solvable solid particles 202 of the material 204, as shown in FIG. 2A, after printing the part and curing, via either Cure Path 1a and 1b or Cure Path 2 as described in FIG. 1A.

Depending on the solvable solid particles 202 added to the ink 200, the pores 210 of the cured printed part 206 may have an average diameter around 45 μm, but may be smaller or larger.

In one approach, a soft segment of a polyurethane portion of the composite may be selected for mechanical properties. In one approach, a soft segment of a polyurethane potion of the resin may be water permeable. Leaching of the solvable solid from the cured composite may result in voids within the cured composite structure where the solid had been present, thereby forming a foam as shown in FIG. 2B.

In various approaches, solids included to load an ink having a radiation-curable component and a nonradiation curable component may be formulated to minimally affect the cure chemistry of the radiation-curable components and the nonradiation-curable components of the ink. For example, and not meant to be limiting, in preferred approaches, the solid may include molecules that do not react with isocyanate molecules, for example, amine, hydroxyl, etc. In some approaches, single molecule organic solids are not preferred for solid loading of a radiation curable, nonradiation curable ink composition.

In some approaches, the solid is essentially not hygroscopic, for example the solid does not attract and hold water from the surrounding environment. In some cases, a hygroscopic solid may transfer water to the polymers and prepolymers of the ink. for example, a hygroscopic solid may transfer water to polyols and thus adversely affect urethane curing.

In a preferred approach, a dried and ground salt, e.g., sodium chloride (NaCl) may be included as a solvable solid. In one approach which is by way of example only and not meant to be limiting in any way, leaching of the NaCl from the cured structure may result in a measurable shrinkage of filaments, with bulk, full density of the entire printed part having an overall shrinkage of approximately 25-28% in volume compared to the pre-leaching volume of the structure. The approximate shrinkage post-leaching may be approximately half the volume of the NaCl originally present in the composite, thereby indicating significant knitting within and between layers holding the structure.

In various approaches, the ink may contain an effective amount of solid for the solid to perform specific functions. For example, but not limited to, the solid may be a porogen to form voids in the printed structure thereby forming a porous structure. The effective concentration of the solid as a porogen may be an amount to form a desired porosity of the structure. The effective amount of the solid is an amount that imparts the desired function or result, and may be readily determined without undue experimentation following the teachings herein and varying the concentration of the additive, as would become apparent to one skilled in the art upon reading the present description.

In some approaches, a concentration of the solid may be less than 75 volume % (vol %) of the total volume of the ink. In one approach, the concentration of the solid may be less than 70 vol % of the total volume of the ink. In one approach, the concentration of the solid may be less than 60 vol % of total volume of the ink. In one approach, the concentration of the solid may be less than 50 vol % of the total volume of the ink. In one approach, the concentration of the solid may be less than 40 vol %, 30 vol %, 20 vol %, 10 vol %, 5 vol %, 1 vol %, etc. of the total volume of the ink.

In various approaches, the voids created by leaching the solvable solids form random pores in the printed structure. Random pores may be defined as pores being located throughout the material in random locations where the solvable solid set in the material during curing. In some approaches, the random pores created by leaching the solvable solids may have bimodal distribution of random pores having different sizes, e.g., having two different average diameters in one material of a structure. For example, the structure material may include large random pores having an average diameter in a range of greater than 500 nm and less than 500 μm and small voids having an average diameter in a range of greater than 5 nm and less than 500 nm (the image in FIG. 11G shows a cured structure having pores of two different sizes). In some approaches, the average diameter of the voids created by leaching the solvable solids from the printed structure may be in a range of about 1 μm to greater than 120 μm, but could be smaller or larger. In some approaches the average diameter of random pores may be in a range of greater than 0 nm to less than 500 nm, greater than 100 nm to less than 250 nm, greater than 500 nm to less than 500 μm, greater than 1 μm to less than 300 μm, etc.

In some approaches, the solid added to the ink may include an additive material as listed in Table 1. In each case, the additive may be added with respect to the curing chemistry, such that the additive does not disrupt the curing chemistry.

In one approach, the solid added to the ink may include a reinforcing material. In some approaches, the reinforcing material may include at least one of the following: nanoclay, fumed silica, graphene, carbon fiber, fiber glass, carbon nanotubes, boron, fibrous materials, glass, Kevlar, etc.

In one approach, the solid added to the ink may include an inorganic material. In some approaches, the inorganic material may include at least one of the following: metal oxide, metal, inorganic composites, etc. In one approach, post processing of the cured printed structure may include thermalizing the cured printed structure for removing the UGAP material from the structure and then sintering the solid particles such that the post-sintered structure is comprised of the inorganic material. For example, adding $Al_2O_3$ to the ink formed a cured printed UGAP/$AL_2O_3$ structure. Sintering the structure may thermally decompose and remove the UGAP material, and then the sintered structure may include $Al_2O_3$ patterned as printed. In various approaches, the inorganic material may include, but not limited to, steel, aluminum, brass, tungsten, etc.

In one approach, the solid added to the ink may include a reactive material. In some approaches, the reactive material may include at least one of the following, an explosive, a fuel oxidizer mixture (propellent), or a metal/metal-oxide mixture (thermite), etc. For example, and not meant to be limiting in any way, a flare may be formed from the ink material with reactive material for providing a flare having a unique geometric shape to control the burn rate profile for specific applications.

TABLE 1

Addictives to Inks

| Additive | Common materials | Effects on polymer composite |
| --- | --- | --- |
| Reinforcing fibers | Boron, carbon, fibrous minerals, glass, Kevlar | Increases tensile strength. Increases flexural modulus. Increases heat-deflection temperature (HDT). Resist shrinkage and warpage. |
| Conductive fillers | Aluminum powders, carbon fiber, graphite | Improves electrical and thermal conductivity. |
| Coupling agents | Silanes, titanates | Improves interface bonding between polymer matrix and the fibers. |
| Flame retardants | Chlorine, bromine, | Reduces the occurrence and spread of combustion. |
| Extender fillers | Calcium carbonates, silica, clay | Reduces material cost. |
| Plasticizers | Monomeric liquids, low-molecular-weight materials | Improves melt flow properties. Enhances flexibility. Reduces glass transition temperature. |
| Colorants (pigments and dyes) | Metal oxides, chromates, carbon blacks | Provides colorfastness. Protects from thermal and UV degradation (with carbon blacks). |
| Blowing agents | Gas, azo compounds, hydrazine derivatives, gas-filled balloons | Generates a cellular from to obtain a low-density material. |

In various approaches, the ink formulations may be measured for spanning capability by measuring sag distance in terms of the extruding ink being able to span a defined gap without sagging, where sagging may be defined as demonstrating a sustained extrusion of the ink along a straight line without underlying support, where the sustained extrusion of the ink may have less than 5% deviation from the straight line along a plane of deposition.

In one approach, sag may be defined as a negative change in thickness of an extruding filament as the filament is extruded as shown in the schematic drawings of FIGS. 3A-3B. FIG. 3A shows an extrusion process 300 an ink 302 being extruded from a nozzle 305 as a filament 306 onto a surface 304. FIG. 3B shows a magnified view of a cross section at the location 3B of the extruded filament 306 in FIG. 3A. Conventional elastomeric inks when extruded may change dimensionally in the extruded filament. As shown in FIG. 3B, an extruded ink that does not demonstrate sag may form a filament 306 having filament height of h. During various conditions of extrusion, e.g., time, temperature, layering, etc., a filament 308 extruded using a conventional elastomeric ink may demonstrate sag that results in negative change dh of the filament height h after extrusion or after subsequent layers applied on top of the extruded filament. For example, conventional elastomeric inks that demonstrate dimensional changes during extrusion may form a filament 308 having a height of h–dh. In preferred aspects of inventive concepts described herein, an elastomeric ink may demonstrate substantially no dimensional changes in filament height during and/or after extrusion.

In one approach, sag may be defined as an added change in width of a three-dimensional structure during extrusion of a continuous filament as the structure is formed in a vertical direction as shown in the schematic drawings of FIG. 3C. FIG. 3C compares an extrusion process 310 an ink 312 to an extrusion process 320 of a conventional elastomeric ink 322 being extruded from a nozzle 305 as a filament 316, 326, respectively, onto a surface 304.

Extruded conventional elastomeric inks may have structural instability and may result in an unstable printed 3D structure. As shown the extrusion process 310, an ink 312 that does not demonstrate sag may be extruded as a filament 316 forming a 3D structure 318. The structure demonstrates minimal dimensional change in width w in the x-y plane on the surface 304. As the 3D structure 318 is printed in the z-direction with the extruded continuous filament 316, the width w may maintain a similar dimension with substantially no dimensional change in the x-y plane.

In conventional processes, as shown in the extrusion process 320, a conventional elastomeric ink 322 may be extruded as a filament 326 forming a 3D structure 328 on a surface 304. An instability of the extruded filament 326 may result in a 3D structure 328 the demonstrated increased width w in the x-y plane as the continuous filament 326 forms the 3D structure in a vertical, z-direction perpendicular from the x-y plane of deposition. For example, as shown in the formation of the 3D structure 328 of the process 320, the width w of the lower layers 330 of the 3D structure 328 may change dimensionally having an increased width, w+dw, from the weight of the upper layers 332 of the 3D structure 328. In preferred aspects of inventive concepts described herein, an elastomeric ink may demonstrate substantially no dimensional changes in the width of the 3D structure formed with a continuous extruded filament.

In some approaches, ink formulations having radiation-curable component (e.g., acrylate) concentration greater than 5 wt % acrylate may demonstrate decreased spanning capabilities due to a significant reduction in ink viscosity. Moreover, ink formulations having a decreased photoinitiator content (e.g., less than 1 wt % of total ink) may demonstrate decreased spanning capabilities due to a reduced concentration of radicals per unit area exposed to UV light. Without wishing to be bound by any theory it is believed that in ink formulations having an increased acrylate concentration and decreased photoinitiator concentration, urethane prepolymers and solid particulate interactions may dominate the rheological properties of the ink since the photo-induced reaction of the acrylates is rate limited by the decreased photoinitiator concentration.

In some approaches, decreasing the concentration of the radiation-curable component in the ink formulation may shift the printability and rheological properties of the ink to be determined by the non-Newtonian flow properties of the nonradiation-curable prepolymers and solid particulates rather than the printability and rheological properties of the ink being determined by the UV-induced curing of the radiation-curable components in the ink.

Figure 7A:
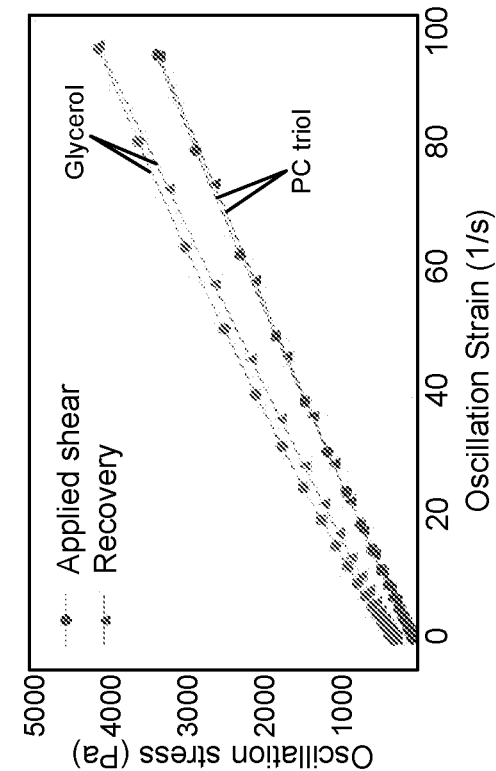
FIG. 7A is a plot of yield stress of ink formulations varying in amount of glycerol or PC triol, according to one aspect of an inventive concept.

In some approaches, tuning the polymer components through increasing the hydrogen bonding of one or many components in the ink may affect sag distance of the printed part. For example, replacing polycaprolactone (PC) polyols with short chain glycerol in the ink may substantially decrease the sag distance, where the sag distance is defined as the maximum distance of extruding a filament without underlying support before the filament begins to sag. Without wishing to be bound by any theory, it is believed that short chain polyols, e.g., glycerol, may dramatically increase hydrogen bonding between the molecules of the ink, and consequently the yield stress of the composite fluid is also increased (as shown in FIG. 7A).

In one approach, increasing the photoinitiator content of the ink may likely increase the curing rate, thereby resulting in a decreased the sag of the extruded filament across unsupported spans. However, ink formulations including the solvable solid NaCl and glycerol or increased photoinitiator concentration may form structures that demonstrate mechanical properties characterized as brittle with poor surface quality. It is likely that replacement of the PC triol with glycerol may drastically increase chain crosslinks between molecules of the ink thereby creating a brittle material. Moreover, increasing the photoinitiator concentration in the ink thereby may increase the number of radicals that in turn may increase chain terminations within the material of the extruded ink thereby resulting in many short chain acrylate-based oligomers that may be less mechanically robust than longer acrylate polymers.

In some approaches, methods of in-situ curing may reduce the influence of rheology on the direct-ink-writing process. However, for optimal print quality in one approach, the composite ink may be tuned for rheology and may have shear-thinning and dilatant-recovery properties. For example, inks having a very low yield stress (e.g., less than 10 Pa), the ink may extrude with unpredictable deposition. Alternatively, inks having an increased yield stress (e.g., greater than 1500 Pa) may be able to print by extrusion of a consistent filament shape where tool paths do not allow for ideal radiation curing of filaments. For example, a part being printed may generate shadows in particular areas of the printed part thereby blocking in situ curing, and thereby resulting in incomplete or inefficient curing. Thus, in some approaches, it may be desirable to use a stiffer ink (e.g., having a yield stress of 500 Pa to 1500 Pa or greater) to minimize sagging in regions that may be accessible to UV-curing during the printing process.

In various approaches, an effective yield stress for ink extrusion may be defined by parameters provided by the printer, for example, the printer capabilities for printing the part, the nozzle for extrusion, the temperature of the printing environment, etc. In preferred approaches, inks may have a yield stress of about 500 to 1000 Pa.

In some approaches, oligomeric triols with hydroxyl content intermediate of the PC triol and glycerol may allow refinement of balancing yield stress and mechanical properties of the ink formulation.

In some approaches, a complete resin curing may be achieved through a two-step curing process, UV-curing then thermal-curing, and also a one-step thermal process. In one approach, a one-step thermal cure may be beneficial since printing conditions may vary from print to print, but a consistent extent-of-cure may be achieved with a final complete heat curing step.

In various approaches described herein, a dual-curing grafted copolymer resin rapidly cures with UV light on the time scales of printing. In one approach, the UGAP resin combined with 70 wt % NaCl forms an easy-to-print composite ink that may cure in two steps with UV light during printing followed by a thermal step. In another approach, the UGAP resin combined with 70 wt % NaCl forms an easy-to-print composite ink that may cure in one step with a thermal step. Both curing pathways may result in material that had a very similar extent of cure, exhibited minimal dimensional changes, and resulted in parts with very similar mechanical properties.

According to various approaches, the combination of partial UV curing of deposited filaments during printing followed by a second curing by thermal treatment may greatly expand the design space by enabling difficult-to-print structures to be printed, such as, structures having a) a free form with sufficient mass balance to prevent collapse, b) a large format/aspect ratio, c) a single walled mold, and d) an overhang and/or a span. In one approach, the curing of the ink may be controlled to form individual filaments. In another approach, the curing of the ink may be controlled to flow and fill a space by modulating the UV-light during the print process. After fully curing the composite with a thermal treatment, aqueous leach extraction of a solvable solid (e.g., NaCl) may produce a closed-cellular foam.

FIG. 4 shows various additive manufacturing processes 400 for using an ink 402, in accordance with one aspect of the inventive concepts described herein. As an option, the present processes 400 may be implemented to construct structures such as those shown in the other FIGS. described herein. Of course, however, these processes 400 and others presented herein may be used to form structures for a wide variety of devices and/or purposes which may or may not be related to the illustrative aspects listed herein. Further, the methods presented herein may be carried out in any desired environment. Moreover, greater or fewer operations than those shown in FIG. 4 may be included in processes 400, according to various aspects of inventive concepts described herein. It should also be noted that any of the aforementioned features may be used in any of the aspects described in accordance with the various methods.

Looking to part (a) of FIG. 4, in one approach, the ink 402 is added to an extrusion device 403 (e.g., nozzle, syringe, plunger, etc.). In some approaches, the ink 402 may include a nonradiation-curable pre-polymer having at least two nonradiation-curable components, a radiation-curable component, a polymer having at least one reactive hydrogen component, and a photoinitiator. The ink 402 may be extruded from the extrusion device 403 to form a structure using several different pathways.

In one approach, as shown in part (b), a free-form printing process 404 includes a device 408 for directing a UV light 406 to irradiate the radiation-curable component of the extruding ink 402 at the nozzle 405 during extrusion of the ink 402. The free-form printing process 404 with a first cure (e.g., in situ irradiation) of the ink 402 may form a free-form coil structure 410.

In one approach, the process 400 may include a second curing step to cure the nonradiation-curable pre-polymer of the ink 402 of the free-form coil structure 410 (e.g., thermal treatment, time duration, etc.) to form a material having radiation-cured components and nonradiation cured components (e.g., UGAP material).

In one approach, a 3D product formed by additive manufacturing having at least one continuous filament arranged in a geometric pattern, where at least one continuous filament may be unsupported. The continuous filament includes a radiation-cured component and a nonradiation-cured component. For example, As shown in the image of part (c) of FIG. 4, a 3D product of direct ink writing using an isocyanate-acrylate ink formed a structure having at least one continuous filament arranged in a geometric pattern, e.g., in the free-form coil structure. During extrusion of the isocyanate-acrylate ink, the continuous filament was irradiated with UV light thereby allowing the formation of the continuous filament arranged in a geometric pattern and the continuous filament is unsupported during extrusion.

A second step of curing with heat cured the extruded ink of the free-form structure 410 to a UGAP material 411. In some approaches, and by way of example only, the free-form coil structure having UGAP material 411 may have a height of over 15 mm (as measured by the ruler in the image of part (c)). In some approaches, the part may be printed to a height determined by the parameters defined by the printer and stage. For example, the part may be printed to a height greater than 15 mm with stage speed and printing rate optimized for the part geometry, tool path, ink rheology, and cure-rate properties.

In some approaches of free-form printing process 404, the ink 402 may include a solvable solid, for example NaCl particles. In some approaches, the solvable solid of the printed structure may be removed by leaching the NaCl particles from the structure with water. The material of the free-form cured coil structure 410 leached of NaCl particles may have a porosity of material of structure shown in the image of part (d) of FIG. 4.

In some approaches, the 3D product formed with the ink 402 by additive manufacturing may be hollow. In some approaches, the 3D product formed with the ink 402 by additive manufacturing may have a unique shape. In one approach, a 3D product is formed where all linear portions of the at least one continuous filament have the same cross-sectional dimensions. Looking back to FIG. 3B, a continuous filament 306 has a cross-sectional dimension h that does not change (e.g., increase or decrease) during extrusion. Moreover, in FIG. 3C, the extrusion process 310 illustrates the formation of a 3D structure 318 with the extruded ink 312, where the continuous filament 316 of the 3D structure has the same dimensions resulting in a structure having a similar dimension at the lower layers of the structure and the upper layers of the structure.

In one approach, as shown in part (e) of FIG. 4, the process 400 of additive manufacturing of a structure 416 may include a full density printing process 412. In one approach, the ink 402 may be extruded from the nozzle 405 as a layer on a substrate 414. A first cure of the full density printing process 412 may include directing a UV light 406 to the layers of the structure 416 as the structure 416 is printed in layers starting from the substrate 414. In one approach, the full density printing process 412 may form a full density (e.g., solid, monolith, etc.) printed structure 416.

In some approaches, the low yield stress of the ink may allow for alternate methods of fabricating arbitrarily shaped parts.

In one approach, the process 400 of including a first cure of a full density printing process 412 may also include a second cure of the full density structure 416 that includes thermal treatment (e.g., heat) to form a urethane-grafted acrylate polymer (UGAP) material.

In one approach, a 3D printed structured formed using an ink having a radiation-curable component and a nonradiation-curable component may form a structure having a plurality of continuous filaments. The 3D structure may include a plurality of non-random pores located between adjacent printed continuous filaments and a plurality of layers comprising the plurality of continuous filaments. For example, as shown in the image of part (f) of FIG. 4, a 3D structure, a 3D structure 417 is formed by a two-step process of in-situ irradiation of radiation-curable pre-polymer of the ink followed by a second step of curing the nonradiation-curable pre-polymer of the ink material of the structure 417.

In one approach, a lower layer 418 of the plurality of layers of the 3D structure 417 is below an uppermost layer 419 of the plurality of layers. The lower layers are printed before the upper layers. A dimension $w_1$ of the lower layer 418 may be the same as a dimension $w_2$ of the uppermost layer 419 of the plurality of layers of the 3D structure 417. In some approaches, the dimension of the layer may be a width, a height, etc. In one approach, the x-y plane of an upper layer of the plurality of layers of the 3D structure, product, etc., is substantially parallel to the x-y plane of deposition. Moreover, the lower layers have substantially no sag.

Looking to part (d) of FIG. 4, a layer 409 of the 3D structure 417 of part (f) may include a plurality of non-random pores 415 located between adjacent printed continuous filaments 413. In some approaches, the average diameter $d_{nrp}$ of the non-random pores may be in a range of about 0.5 times ($0.5d_f$) to about 10 times ($10d_f$) the average diameter $d_f$ of the extruded filament. In some approaches, the average diameter $d_{nrp}$ of the non-random pores may be in a range of greater than 0 microns (μm) to less than 50 μm. In some approaches, the average diameter $d_{nrp}$ of the non-random pores may be in a range of greater than 0 μm to less than 10 μm. In some approaches, the diameter $d_{nrp}$ of the non-random pores may be greater than 10 μm, 50 μm, 100 μm, 500 μm, 1 mm, 10 mm, etc.

In some approaches, at least one of the plurality of continuous filaments spans an unsupported distance, where at least one of the plurality of continuous filaments has less than 5% deviation in a z-direction from an x-y plane of deposition along the unsupported distance, wherein the z-direction is perpendicular to the x-y plane of deposition.

In one approach, substantially no sag may be defined as less than 10% sag distance relative to void gap. Sag distance is the distance (e.g., measured in millimeters) of the extruded filament deviating from a horizontal plane of deposition over a void (e.g., unsupported gap), further the void may be measured as a distance between opposite landings of the gap.

In one approach, the printed filaments may span the gaps having a distance in a range of greater than 0 mm to less than 10.0 mm, and may be higher. In preferred approaches, the printed filaments may span gaps having a distance in a range of greater than 8 mm and less than 10 mm. In some approaches, ink formulations having photoinitiator 1 wt % or greater may extrude filaments that span gaps in a range of greater than 4 mm to less than 8 mm.

For example, the structure in the image of FIG. 9G represents continuous filaments spanning an unsupported distance with essentially less than 5% deviation in a z-direction from an x-y plane of deposition. In some approaches, at least one of the plurality of continuous filaments may span an unsupported distance in a range of greater than 1 millimeter to less than 10 millimeters.

In some approaches, the full density 3D structure 417 may have a height of greater than 5 mm, greater than 10 mm, greater than 15 mm, greater than 20 mm, greater than 30 mm, greater than 40 mm, greater than 50 mm, greater than 60 mm, greater than 70 mm, greater than 80 mm, etc.

In some approaches, the full density 3D structure 417 may have an aspect ratio (i.e. height:width) of greater than 2:1, greater than 4:1, greater than 6:1, greater than 8:1, greater than 10:1, etc.

In various approaches, a fully dense part may be printed to a height limited only by the printer specifications. For example, the printed part as shown in FIG. 6B was printed in the z-direction to the limit in the z-direction of the printer used to form the part. The ink forming a fully dense part using the methods described herein may allow any height to be formed. The ink may not limit the height of the printed fully dense part. Rather, the size of the printer, and the printer's specifications, may limit the height of the part being printed.

In some approaches of full density printing process 412, the ink 402 may include a solvable solid. In some approaches, the solvable solid, for example NaCl particles, of the printed structure, may be removed by leaching the NaCl particles from the structure with water. In some approaches, the printed 3D product may include an elastomer material permeable to water, thereby allowing water to permeate the material of the structure and dissolve the solvable solid in the material.

The material of the full density printed structure 416 leached of NaCl particles may have a porosity of material of structure shown in the image of part (d) of FIG. 4. In some approaches, the elastomer material of the printed 3D product may include a plurality of random pores having previously held a solvable solid.

In one approach, a material of the printed filaments may include urethane acrylate grafted acrylate polymer and a plurality of random pores. As shown in the image of part (d) of FIG. 4, the material may include UGAP and a plurality of random pores as depicted by the small random black dots in the printed filaments 413. In some approaches, a bimodal distribution of average diameters of the plurality of random pores may include pores having an average diameter in a range of greater than 5 nm to less than 500 nm and pores having an average diameter in a range of greater than 500 nm to less than 500 μm.

In some approaches, an average diameter of the plurality of random pores may be in a range of greater than 0 nm to less than 500 μm. In one approach, an average diameter of the plurality of random pores may be in a range of greater than 10 nm to less than 200 μm, greater than 20 nm to less than 100 μm, etc.

In some approaches, the average diameter of the random pores may be less than 100 nm, less than 50 nm, less than 20 nm, less than 10 nm, etc.

In one approach, the ink may allow for high precision printing of large format (e.g., greater than 8 cm tall) and large aspect ratio (e.g., 8 to 1) parts. In one approach the ink may allow printing filaments that are not fully supported. For example, and not meant to be limiting in any way, printing a freeform helix.

In various approaches, the composite ink may be used to print free-form molds (e.g., a double filament) while curing with the UV-light, followed by filling the space within the mold with the same ink in the absence of a UV cure, and finally thermally curing the entire part to the same cure state. The printed form and infill method of fabrication may be beneficial for making printed parts with a 3D/DIW printer through the extrusion process that may exhibit mechanical properties similar to the bulk material properties of the ink.

As shown in part (g) of FIG. 4, in one approach, a free-form printing process 404 as shown in part (b) may be used to form an outer mold 420 of a structure 422. As the ink 402 is extruded from the nozzle 405, a UV light 406 is directed on the extruded filament to cure an outer mold 420 of a structure 422. The first cure of the ink 402 forming the outer mold 420 may allow the filaments formed by the ink 402 to have a physical property of being rigid and thus the cured filaments may function as an outer mold 420 of a unique-shaped structure. A unique-shaped structure may be any structure that does not have a typical shape. In some approaches, a shape of a unique-shaped structure may be defined by a user, a computer program, etc.

In some approaches, the rigid outer mold 420 allows the structure 422 to be infilled with a material. As shown in part (h) of FIG. 4, the outer mold 420 provides a defined mold for infilling the structure with an ink. In some approaches, the ink 402 to be infilled in the mold is the same ink 402 used for the outer mold 420. In some approaches, the ink to be infilled in the mold may be different than the ink 402 used for the outer mold 420. As shown in part (h), the ink 402 is extruded from the nozzle 405 to the space 424 bounded by the outer mold 420 of the structure 422, but the extrusion of the ink 402 occurs in the absence of UV-light.

In one approach, as shown in part (i) of FIG. 4, the additive manufacturing process 400 of forming an infilled structure 422 having an outer mold 420 and an infill of ink 402 may include a second step of curing (e.g., heat, time duration, etc.) to the structure formed of extruded ink 402 to form a material having a radiation-cured component and a nonradiation-cured component 426 (e.g., UGAP material) throughout the unique-shaped solid structure 428.

In some approaches, the ink 402 used in the additive manufacturing process 400 of forming a unique shaped structure 428 may include a solvable solid. In some approaches, the solvable solid, for example NaCl particles, of the printed structure, may be removed by leaching the NaCl particles from the structure with water. The material having a radiation-cured component and a nonradiation-cured component 426 (e.g., UGAP material) of the unique-shaped structure 428 leached of NaCl particles may have a random porosity (e.g., random pores formed from leaching the solvable solid from the material) of material of structure shown in the image of part (d) of FIG. 4.

Figure 5:
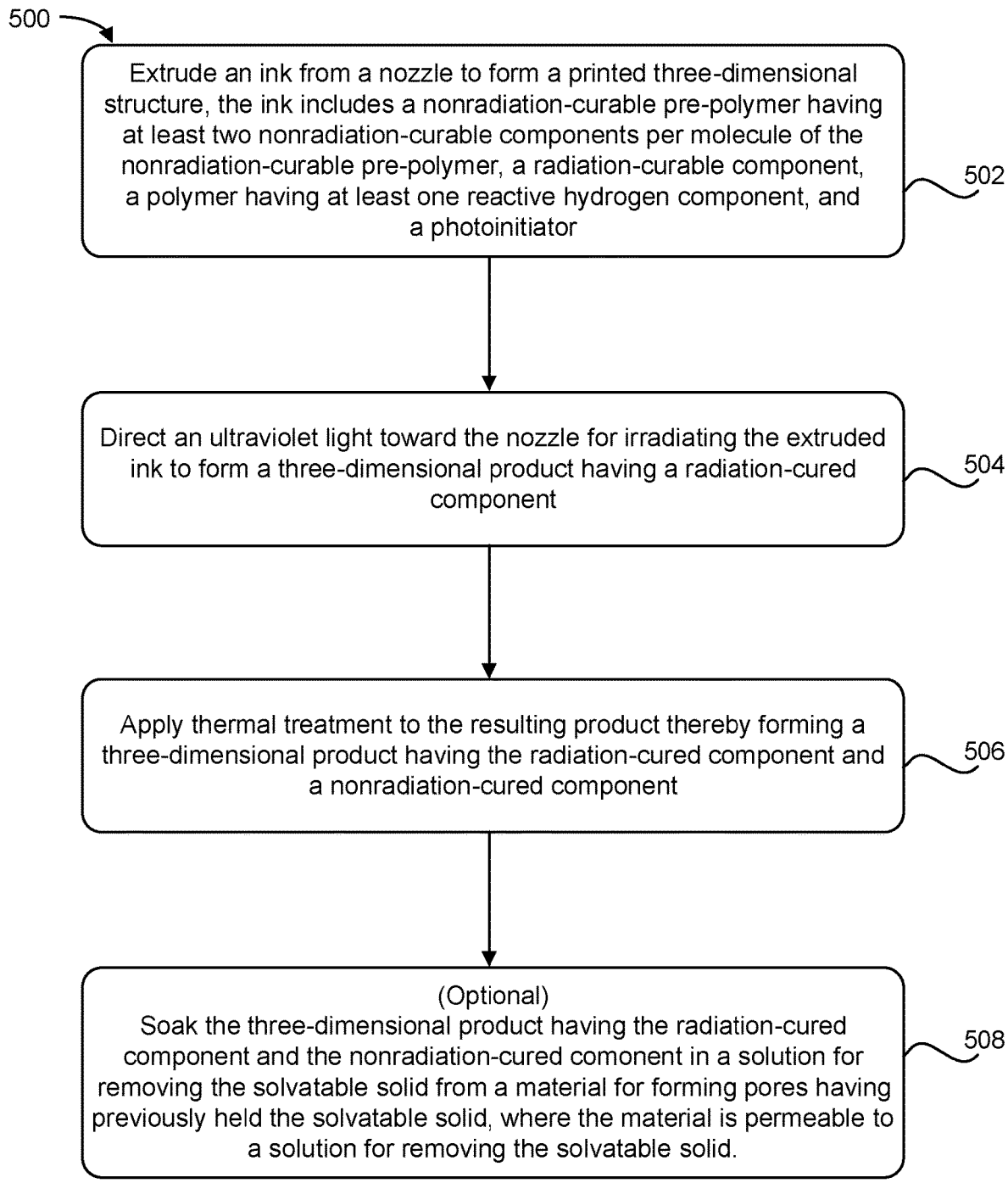
FIG. 5 is flowchart of a method, according to one aspect of an inventive concept.

FIG. 5 shows a method 500 for forming a three-dimensional printed product, in accordance with one aspect of the inventive concepts described herein. As an option, the present method 500 may be implemented to construct structures such as those shown in the other FIGS. described herein. Of course, however, this method 500 and others presented herein may be used to form structures for a wide variety of devices and/or purposes which may or may not be related to the illustrative aspects listed herein. Further, the methods presented herein may be carried out in any desired environment. Moreover, greater or fewer operations than those shown in FIG. 5 may be included in method 500, according to various aspects of inventive concepts described herein. It should also be noted that any of the aforementioned features may be used in any of the aspects described in accordance with the various methods.

Operation 502 of method 500 begins with extruding an ink from a nozzle to form a printed three-dimensional structure. The ink may include a nonradiation-curable pre-polymer having at least two nonradiation-curable components per molecule of the nonradiation-curable pre-polymer, a radiation-curable component, a polymer having at least one reactive hydrogen component, and a photoinitiator. In various approaches, the polymer having one reactive hydrogen component may provide a reactive hydrogen to react with the nonradiation-curable component of a nonradiation-curable pre-polymer to form a nonradiation-cured bond. For example, in one approach, a polyol having a reactive hydrogen component as an alcohol component, OH, would react with the isocyanate component of an isocyanate pre-polymer to form urethane bond (as shown in part (a) of FIG. 1B). In another approach, a polyamine having a reactive hydrogen component an amine component would react with the isocyanate component of the isocyanate pre-polymer to form a urea bond (as shown in part (b) of FIG. 1B). In one approach, the ink may include a solvable solid as described herein.

In some approaches, the ink as described herein may be used in techniques of additive manufacturing. In various approaches, the ink may be extruded using direct ink writing techniques of additive manufacturing. In other approaches, the ink may be extruded using digital light projection techniques of additive manufacturing. In one approach, the ink may be used as a resin bath where the top of the resin may be exposed to UV light in a certain pattern (a projected picture) and cured. After curing, the cured part may be pulled from the resin and the next layer may be exposed to the UV light for sequential printing and curing.

In one approach, the ink may be extruded as filaments in a geometric arrangement. In one approach, the ink may be extruded in layers having varying angled overhangs. For example, and not meant to be limiting in any way, in one approach, the upper layers of printed filaments may have greater horizontal dimensions than the lower layers, where the horizontal dimension, e.g., x-direction as shown in FIGS. 9E-9F, is parallel to the plane of deposition, and the resulting structure has a plurality of layers generating an overhang not supported by the lower layer (e.g., previous layers). In some approaches, the angle relative to the z-direction perpendicular to the plane of deposition may be in a range of 0° to 45°, and may be greater. FIGS. 9E-9F show examples of printed structures having an overhang angle of approximately 0°, 15°, 35°, and 45°.

In some approaches, filaments may be extruded with the ink formulation to form a 3D structure having greater than 40% density, where the 40% of the volume of the structure is comprised of printed filaments and 60% of the volume of the structure is void space. In some approaches, filaments may be extruded with the ink formulation to form a 3D structure having greater than 60% density, where the 60% of the volume of the structure is comprised of printed filaments and 40% of the volume of the structure is void space. In some approaches, filaments may be extruded with the ink formulation to form a 3D structure having greater than 80% density, where the 80% of the volume of the structure is comprised of printed filaments and 20% of the volume of the structure is void space.

Operation 504 includes directing a UV light toward the nozzle for irradiating the extruded ink to form a UV-cured printed three-dimensional product, structure, etc. In one approach, the UV light may be directed to an external region of the nozzle during extrusion of ink from the nozzle. In one approach, the UV light may be directed to the printed filaments of extruded ink on a substrate.

In some approaches, directing the UV light as the ink formulation is extruded may generate a single filament free-form helix structure (e.g., as shown in FIG. 9H). In some approaches, the printed structures may be stable after extrusion and UV curing such that the structure may be handled and may rebound under an applied force without permanent deformation.

Operation 506 of method 500 includes applying thermal treatment to the resulting product thereby forming a three-dimensional product having a radiation-cured component (e.g., UV-cured) and a nonradiation-cured component (e.g., thermally-cured). In one approach, operation 506 may form a printed 3D structure having urethane grafted acrylate polymer material. In some approaches, the reaction may occur at ambient temperature for an extended duration of time. In some approaches, applying thermal treatment may involve heating the formed structure to a temperature to accelerate the reaction between alcohol components of the polyols and the isocyanate components of the isocyanate-acrylate compounds to form a urethane linkage. In various approaches, the thermal treatment may include heating the structure at a temperature in range of about 40° C. to about 80° C., but may be higher or lower. In one approach, the thermal treatment includes heating the structure to a temperature that will effectively cause the isocyanate components and hydroxyl components of the polyol component react to form a urethane linkage throughout the material in a defined duration of time.

In one approach, operation 506 may form a printed 3D structure having urea grafted acrylate polymer material. In some approaches, the reaction may occur at ambient temperature for an extended duration of time. In some approaches, applying thermal treatment may involve heating the formed structure to a temperature to accelerate the reaction between amine components of the polyamines and the isocyanate components of the isocyanate-acrylate compounds to form a urea linkage. In various approaches, the thermal treatment may include heating the structure at a temperature in range of about 40° C. to about 80° C., but may be higher or lower. In one approach, the thermal treatment includes heating the structure to a temperature that will effectively cause the isocyanate components and amine components of the polyamine component react to form a urea linkage throughout the material in a defined duration of time.

In some approaches, the preferred temperature for thermal treatment is below a temperature that may affect the solid in the ink formulation. For example, for ink formulations having an energetic solid, a low temperature is preferred for thermal treatment to form the urethane linkages of the material of the printed structure.

In one approach, following application of thermal treatment, the printed structures demonstrate essentially minimal dimensional changes. Without wishing to be bound by any theory, it is believed that the first cure of UV radiation of the extruded filament forms a stable crosslinked matrix that protects against expansion or contraction caused by full curing of the polymers.

In one preferred approach to form a 3D structure having random porosity in the material having a radiation-cured component and a nonradiation-cured component, the ink includes a solvable solid. In one approach, the thermally-cured, UV-cured printed three-dimensional product includes a material permeable to water. In one approach, operation 508 includes soaking the 3D printed product in a solution for removing the solvable solid from the material for forming pores having previously held the solvable solid.

As illustrated in parts (g), (h), and (i) of FIG. 4, operation 502 of method 500 of FIG. 5 may include a multiple steps to extrude the ink with different cure paths. In one approach, the 3D structure formed from operation 502 is an outer mold of a unique-shaped structure. A next operation may include extruding additional ink from the nozzle onto and/or into the three-dimensional structure having a radiation-cured component that is an outer mold of a final structure. In one approach, the additional ink is the same ink used to form the outer mold of the structure. In another approach, the additional ink is a different ink than the ink used to form the outer mold of the structure. In some approaches, the additional ink is used to infill the void space bounded by the outer mold of the structure.

An operation after the infill of the additional ink includes applying thermal treatment to the resulting structure thereby forming a urethane grafted acrylate polymer material. The resulting structure, including the outer mold and the infill extruded ink, is thermally cured to form a 3D elastomeric structure having substantially homogenous UGAP material.

Figure 10A:
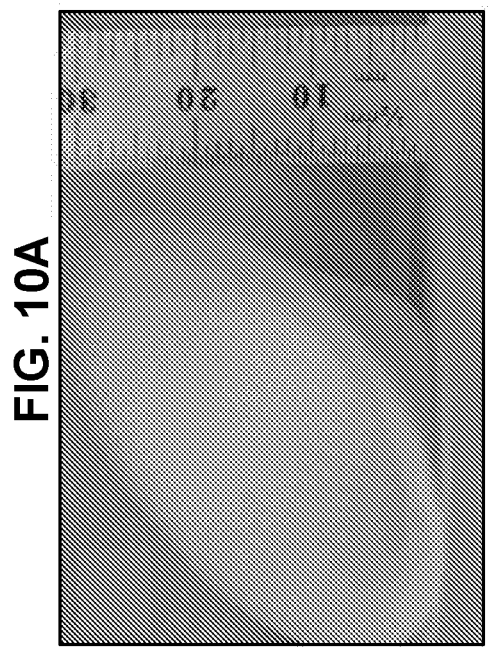
FIG. 10A is an image of a hollow cone, according to one aspect of an inventive concept.
Figure 10B:
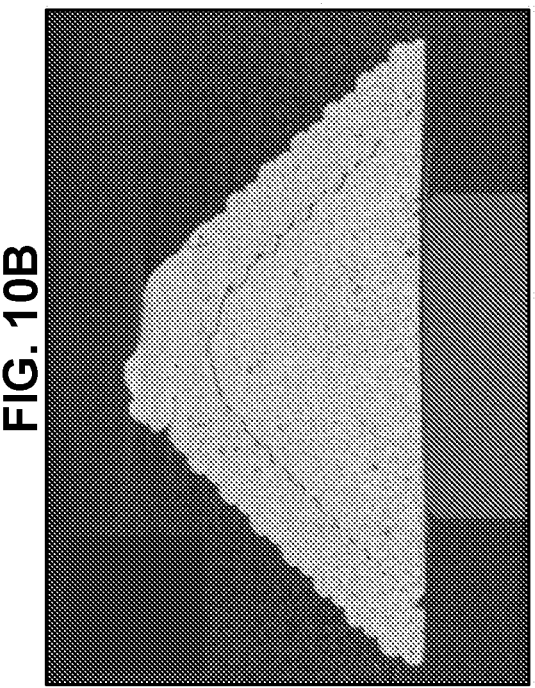
FIG. 10B is an X-ray CT image of an infilled cone cured under pressure, according to one aspect of an inventive concept.
Figure 10C:
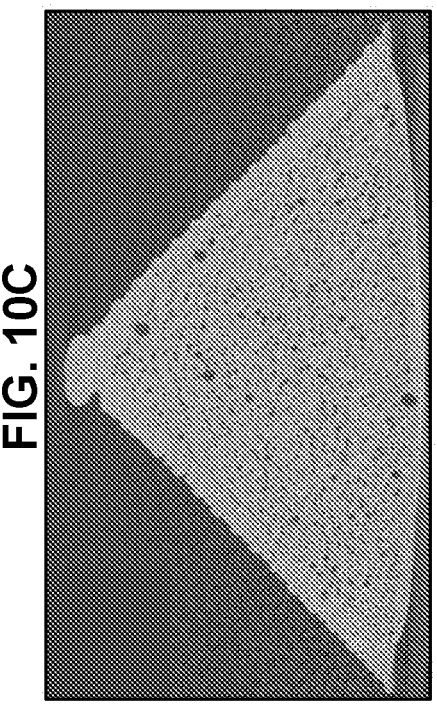
FIG. 10C is an X-ray CT image of an infilled cone cured at ambient pressure, according to one aspect of an inventive concept.

For example, and not meant to be liming in any way, as shown in FIG. 10A-10C, a cone structure may be printed with in situ UV curing (FIG. 10A), followed by infill of the cone with the ink formulation without UV light, followed by application of a thermal cure of the entire structure (cone and infill) (FIGS. 10B-10C).

In some approaches, a solvable solid may be added to the ink extruded for the outer mold and/or infill material. In some approaches, the 3D structure includes a material having a radiation-cured component and a nonradiation-cured component such that the material is water permeable. In one approach, after the thermal curing of the 3D structure, the structure may be soaked in water to remove the solvable solid thereby creating voids where the particles of the solvable solid were present before soaking in water. In some approaches, the solvable solid may be NaCl particles.

In one approach, due to the water-permeable nature of a fully cured UGAP material, the NaCl particle solids may be completely leached from the parts with water leaving behind a foam elastomer. Combined with 3D print designs, the extraction of the NaCl may create multiple levels of open and closed cellular foam structures. In one approach, a NaCl composite material may exhibit drastically different mechanical properties compared to NaCl-leached foams, with foams having significantly lower compression strengths and greater tensile strengths. The distribution of, and the size and shape of the pores in the foam may be defined by NaCl particle size and morphology. In some approaches, different pore sizes in the foam may result in different mechanical properties.

In some approaches, two different ink formulations may be combined before extrusion to print a part, one ink having solid material that dissolves in water and the other ink having solid material that does not dissolve in water. In one approach, the inks may be combined prior to extrusion as a gradient, then following curing of the printed part, the part may be leached of solvable solid thereby resulting in a gradient cushion. In one approach, the resulting printed part may have soft, elastomeric regions and hard, glassy regions within one material of the printed part.

In various approaches, the ink formulations described herein may form soft elastomers at room temperature having a glass transition $T_g$ temperature below 0° C. In one approach, an ink having only a radiation-curable component but without a nonradiation-curable component may have a $T_g$ temperature above 0° C., and have a physical characteristic of being hard, rigid, etc. at room temperature. In one approach, an ink having combined radiation-curable component and nonradiation-curable pre-polymer as described herein may exhibit elastomeric properties compared to an ink with only radiation-curable component.

With minimal effort and foresight, the ink may also be capable of having many secondary properties allowing further processing/refinement of the printed parts.

Experiments

Materials

The polycaprolactone (PC) polyester oligomers, Capas 8025D and 8025E, and additional PC oligomers of varying molecular weights were provided by Perstorp Chemical Manufacturing Company (Malmo, Sweden) and used as received. Glycerol (Spectroscopic grade, 99.5%, Acros Organics, Thermo Fisher Scientific, New Jersey, USA) was used as received.

Radiation curing polyisocyanates, EBECRYL 4396, was provided by Allnex USA Inc. (Georgia, USA) and stored in the dark in a desiccator with active Drierite (W. A. Hammond Drierite Co. LTD, Ohio, USA) until needed. Sodium chloride (99.9% purity, Sigma Aldrich, Missouri, USA) was ground with an automatic mortar and pestle, and then separated into desired particle size by sieving. Ground powders were dried over night at 100° C. and stored in a desiccator until needed. Ethylene glycol phenyl ethyl acrylate (PEA), stabilized with 75-125 ppm hydroquinone and 0-120 ppm hydroquinone monomethyl (82%, Sigma Aldrich, Missouri, USA) 1,6-hexanediol diacrylate (HDDA), stabilized with 100 ppm monomethyl ether hydroquinone (80%, Sigma Aldrich, Missouri, USA), isobornyl acrylate (IBA, Gottingen, Germany), stabilized with 4-methoxyphenol (90%, TCI America, Oregon, USA), and Irgacure 819 (phenylbis-2,4,6-trimethyl benzoyl phosphine oxide, 97%, Sigma Aldrich, Missouri, USA) were all used as received.

The solids and resin were mixed in a FlackTek DAC 150.1 FV-K SpeedMixer (South Carolina, USA) for no longer than 60 s intervals at 2000 rpm.

The yield stress and hysteresis of the uncured inks were measured on a TA Instruments AR2000ex rheometer (Delaware, USA). Samples were placed between a cross-hatched 25 mm Peltier parallel plate with a thickness of 1.5 mm Yield stress was obtained by logarithmic amplitude sweep between 3 and 10000 Pa at a frequency of 1.0 rad s$^{-1}$, and hysteresis was obtained by ramping the shear rate from 0 to 100 to 0 rad s$^{-1}$. For UV-dependent rheology, the same rheometer was equipped with UV light-guide attachment and disposable acrylic-aluminum parallel-plate fixtures for in-situ monitoring of UV curing. An Omnicure S2000 lightguide (Excelitas Technologies, Colorado, USA), 400-500 nm filter and Thorlabs power meter (New Jersey, USA) were utilized, ensuring that a light intensity range of 0.2-1.0 mW/cm$^2$ light intensity was attained at the surface of the bottom acrylic plate prior to each experiment.

Photosensitive solids-loaded resin was placed on top of the acrylic plate and sandwiched with the top aluminum plate geometry with 840 µm spacing. For depth of cure experiments, spacing was varied from 840, 740, 640, 540, 440, 340, 240, and 140 µm. All experiments were conducted at ambient temperature conditions, 25±2° C. Dynamic oscillatory experiments were performed as a function of time with constant strain and frequency set to 0.5% and 1 rad s$^{-1}$, respectively. Application of low strain was assumed to not dramatically disturb the curing network. All experiments were exposed to UV light after a 120 second stabilization period, and G' and G" were recorded for 400 seconds thereafter.

Ex-situ attenuated total reflectance (ATR) FTIR data was acquired with a Bruker Alpha spectrometer (Wisconsin, USA). A resolution of 4 cm$^{-1}$ was used while averaging 32 scans. Four DIW filament printed samples were characterized to determine the effect of both UV and heat curing on functional component conversion as follows: uncured, only UV cure, UV cure+80° C., and only 80° C. FTIR peaks of interest: 2270 (N=C=O stretch); 1620-1640 (C=C stretch); 810 (C—H stretch). Real-time UV Fourier transform infrared spectra (UV-FTIR) was obtained with a Bruker Vertex 80 (Wisconsin, USA) equipped with a MCT detector, a KBr beam splitter, and a UV horizontal apparatus attachment. A resolution of 8 cm was used while recording one spectrum every 2 ms.

Resin without solids was pipetted onto a 32 mm round (3 mm thick) NaCl crystal polished discs with a 30 µm thickness shim (double-sided PET adhesive tape) on the edges and sandwiched between another NaCl crystal. Cross-linking was initiated via an Omnicure S2000 light guide with a 400-500 nm filter. A Thorlabs power meter measured 1 mW/cm$^2$ at the surface of a blank NaCl sandwich prior to acquiring data. Samples were irradiated, and spectra was recorded until no change was observed in the peaks of interest.

Prepared inks were loaded into Nordson Optimum UV-blocking 30 cc syringes (Nordson EFD, Rhode Island, USA) and degassed in the Flacktek for 2 minutes at 3500 rpm. An air-powered fluid dispenser (Ultimus V, Nordson EFD) was used with the Optimum syringe piston to extrude the ink through an 0.840 µm tapered nozzle wrapped in aluminum foil, or covered in Kapton as a UV block to inhibit UV-curing in the nozzle.

The stationary syringe was attached to a custom UV light mount equipped with trifurcated light guide attached to an Omnicure S2000 lightguide (Excelitas Technologies, Colorado, USA) with a 400-500 nm filter. Parts were printed using an Aerotech ANT 130-XY and 130-L-Z5 axis stage (Aerotech, California, USA). The axis stage was controlled via an A3200 controller through an Aerotech A3200 CNC operator interface (v.5.05.000). G-code instructions were programmed and run through the controller software to generate structures using a continuous toolpath. For structures where a continuous toolpath was not possible, precision extrusion was achieved using a progressive cavity dispenser (ViscoTec eco-PEN450, Georgia, USA) with G-code generated by the open-source software Slic3r (3D slicing software, developed by Alessandro Ranellucci). For the full dense cone, a two-filament thick outer mold was printed and immediately removed from the substrate. The internal cavity was hand filled using the air-powered fluid dispenser until filled, and then immediately heat cured at 40° C. for 72 h. All parts were printed onto aluminum substrates.

Lattice structures of 0.5 cm×1 cm×1 cm were used to measure compression properties on an Instron 5943 (Instron, Massachusetts, USA) with a 100 N load cell. For tension tests, outlines of Type IV dog bones (115 mm in length, 19 cm in width) were printed and manually infilled with an air-powered fluid dispenser and syringe. Once filled, the dog bones one the aluminum substrate were placed on a vortex shaker and allowed to be shaken until the ink was evenly distributed. Parts were then cured in an ELC-500 UV Curing Chamber (Fusionet, LLC, Maine, USA) producing wavelengths of 320-400 nm for 2 minutes and subsequently heat cured at 80° C. for 24 h.

Removal of sodium chloride from final printed structure (solids unloading) was performed by placing printed parts in a covered container of distilled water at 100° C. A magnetic stir bar was used for agitating the parts in the water for up to 10 hours. Weights of the parts were measured before and after extracting the solids. Spanning tests were performed on custom manufactured blocks with increasing void distances of 1.0, 1.5, 2.0, 3.0, 4.0, 6.0, 8.0 and 10.0 mm as shown in FIG. 6D and were constructed to directly compare different the abilities of the formulations to span gaps. The distance of sag of each printed line over varying gaps was measured with a Keyence One-shot 3D Measurement Macroscope VR-3200 (Keyence, Illinois, USA) and analyzed with VR-3000 Series Viewer & Analyzer Software (Keyence). The surface of each sample was sprayed with zinc stearate to dull the reflection prior to analysis.

Samples for SEM analysis were cut from blocks of printed material and mounted on stubs using carbon tape. All samples were coated with nominally 3.3 nm of gold to prevent charging. SEM images were taken using a Zeiss Sigma HD VP Scanning electron microscope (Zeiss, New York, USA) with a 30.00 μm aperture, 2.00 keV beam energy, and ca. 5.0 mm working distance. Two detectors, SE2 and InLens, were utilized at either 100% SE2 to 0% InLens or 75% SE2 to 25% InLens mixing ratios—the mixing number in the label indicated the InLens (SE1) detector level. The SE2 detector (Everhart-Thornley detector) is highly sensitive to topography while the InLens detector will provide more surface detail. Both detectors are secondary electron detectors.

Standard Ink Formulation

Ink development was performed by varying three major components of the resin: a) urethane segment consisting of ca. 2000 molecular weight polycaprolactone (PC) polyols in a 10:1 ratio of diol to triol and the molar equivalent acrylate-isocyanate linker (AIL), b) the acrylate graft monomers consisting of mono- and di-functional acrylates, and c) the photoinitiator. The ink was optimized for a) extrusion flow quality, b) cure rate and ability to span gaps, and c) mechanical properties of the cured resin/composite. As a rapid demonstration candidate inks were extruded across a block containing increasingly larger gaps and the resulting distance of sag was measured as a function of gap length. For these tests, a constant printing speed of 15 mm s$^{-1}$ was used with a UV-light intensity of 0.6 mW cm$^{-2}$ and ca.0.67 s of light exposure for each filament segment.

The ability of the printed filaments to span the gap derives from the combination of curing rate of the acrylates and the rheological properties of the ink. Sample formulations with varying acrylate content, photoinitiator content, or hydrogen bond donating (i.e. glycerol triol, 55 wt % hydroxyl content, compared to 8.4 wt % hydroxyl for PC triol) replacement of the PC triol, as well as the block fixture and dimensions of gaps, are shown in FIG. 6D. A solids loaded composite of UGAP with a bimodal distribution of NaCl particles (70/30 wt % course to fine) was loaded at 70 wt % (54 vol %) increasing the viscosity such that the composite ink had a yield stress point suitable for extrusion printing. The solids loading at 70 wt % was used for all formulation testing and for printing parts.

To test the mechanical properties of the outer shell cured structures as it pertains to print part integrity, UV-only cured parts 10 mm×10 mm×5 mm printed at full density at 15 mm s$^{-1}$ (about 10 s UV exposure per layer). FIG. 6A depicts a plots of resulting compression (in terms of Extension in mm, x-axis) on a printed part without thermal or further curing the UV-only cured printed part by applying a load of 0.00317 N s$^{-1}$ (y-axis) to simulate the force applied by additional layers added to the lattice structure. The compression of radiation-cured material demonstrates the stability to continuously print the radiation-cured material in subsequent layers (without any thermal curing steps).

A load sweep profile was recorded to determine the compression that results from each additional layer, up to an estimated height of 225 mm of material (1.2 N of force) added to the top of the printed lattice structure FIG. 6A. This is an estimated height because the additionally added layers will themselves slightly compress adding to the overall dimensional change. The small test sample exhibited a decrease in height of 0.033 mm due to the 1.2 N of force. This equates to only 0.0014% of the total theoretical 230 mm height, a negligible distance for a part of this size. This demonstrated that the resulting yield stress of filaments only UV-cured during the printing process (e.g., no thermal curing) no longer depends on shear-thinning properties of the ink to support the mass of additional layers.

These results shifted the dimensional limitations of printable objects to the physical height of the printer. FIG. 6B is an image of a printed part at the height limitation of a printer with a full dense lattice printed in a single print greater than 87 mm in height.

FIG. 6C is a plot showing the spanning capabilities of different ink formulations. Ink formulations with greater than 5 wt % acrylate (curve ◇) had decreased spanning capabilities due to a significant reduction in ink viscosity. As expected, reducing the photoinitiator content (curve ■) decreased the spanning capabilities of the ink due to decreased radical concentration per unit area exposed to UV light. For the increased acrylate and decreased photoinitiator spanning formulations, urethane prepolymers and solid particulate interactions in the ink dominate the rheological properties since the photo-induced reaction of the acrylates was rate limited.

Decreasing the amount of acrylate shifted the dominating effects in the rheological properties from the UV-induced curing of the acrylates to the non-Newtonian flow properties of the urethane prepolymers and solid particulates.

The replacement of the PC triol with glycerol (curve ○) substantially decreased the sag distance due to the dramatic increase in hydrogen bonding and consequently the yield stress of the composite fluid. Likewise, increasing photoinitiator content (curve •) increased the curing rate and consequently decreased the sag across spans. However, the mechanical properties of bulk samples of the NaCl filled composite containing glycerol or increased photoinitiator concentration resulted in a composite that was brittle with poor surface quality. It is likely the case that replacement of the PC triol with glycerol drastically increased the chain crosslinks creating a brittle material. Likewise, increasing the photo-initiator concentration increased the number of radicals increasing the chain terminations within the material resulting in many short chain acrylate-based oligomers that were less mechanically robust than longer acrylate polymers.

The sample formulation (curve □) that produced the highest quality filaments while minimizing sag contained 70 wt % NaCl and 30 wt % resin (12.25 wt % Perstorp 8025D PC diol, 1.23 wt % Perstorp 8025E PC triol, 10.52 wt % Allnex EBECRYL 4396 radiation curing isocyanate, 4.5 wt % phenoxyethyl acrylate, 0.5% 1,6-hexanediol diacrylate, and 1.0 wt % Irgacure 819 photo-initiator), herein identified as the standard formulation (SF). While 1 wt % photoinitiator is typically considered high for UV-curing systems, the increased viscosity, rapid surface curing, and significant light scattering from the loaded solids preferred additional photoinitiator to exhibit sufficient cure rates.

Resin and Composite Properties

Basic material characteristics such as the glass transition temperature ($T_g$), shore hardness, and UV-dependent reaction rates are primarily dependent on the relative ratios of the constituents within a formulation. Characterization of material properties was performed on cured samples of the UGAP resin as well as on cured samples of the acrylate and urethane polymers. The $T_g$ of the acrylate components, acrylate components with the AIL (same ratio used in the combined resin), urethane resin, and UGAP was 9.51° C., −35.2° C., −36.0° C., and −36.0° C. respectively.

The measured Shore A hardness of the of cured acrylate-only resin, urethane-only resin, and UGAP resin, was measured to be 80.1, 53.6, and 72.7, respectively.

Overall extent of reaction in fully cured UGAP samples was determined by swelling a sample in acetone and gravimetrically determining leached (and therefore presumed to be not crosslinked/bound) resin. The resulting cured composite ink had a $T_g$ of −34.7° C. and Shore A hardness of 71.0.

Rheology and Cure Chemistry of Composite Ink

Figure 7B:
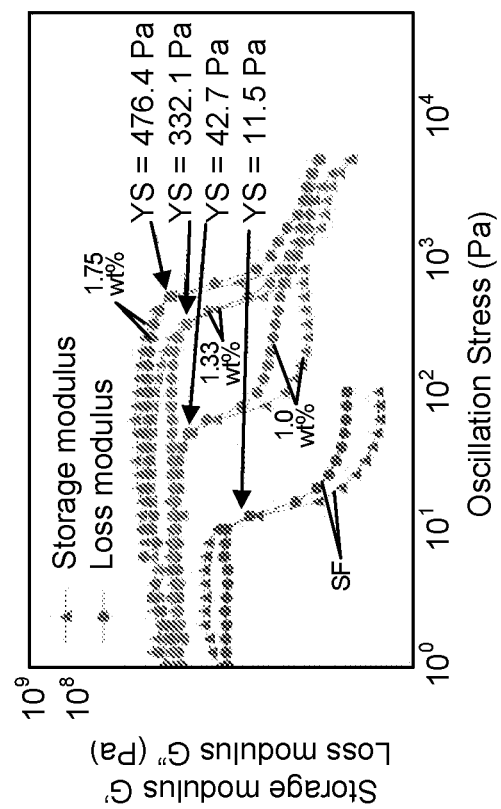
FIG. 7B is a hysteresis plot of ink formulations with glycerol or PC triol.

FIGS. 7A and 7B depict plots of hysteresis curves (FIG. 7A) and oscillation stress vs. oscillation strain (FIG. 7B) of the standard formulation (SF) of ink. FIG. 7A is a plot of yield stress of formulations containing varying amounts of glycerol or PC triol. The SF displayed a low hysteresis and a yield stress of 11.5 Pa, FIG. 7A, but sufficient for predictable extrusion. Increases in flow yield-stress were obtained with modest amounts of polyols with significantly greater wt % hydroxyl content such as glycerol. Formulations containing 1.0 wt %, 1.33 wt %, and 1.75 wt % glycerol (with corresponding molar equivalence of isocyanate) resulted in yield stresses of 42.7 Pa, 332.1 Pa, and 476.4 Pa respectively FIG. 7A. Further increases in glycerol did not result in additional increases in yield stress, indicating a saturation point of hydrogen bonding effects.

FIG. 7B demonstrates that replacing the PC Triol with glycerol generated formulations with glycerol that exhibited a low hysteresis and a more ideal yield stress point for extrusion-based printing. However, the mechanical properties of the cured materials containing greater than or equal to 1.75 wt % glycerol were too friable for practical use.

Figure 8A:
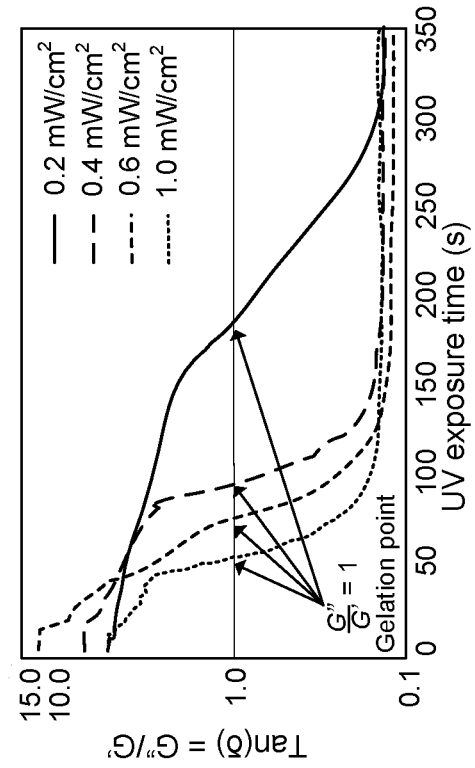
FIG. 8A is a plot of Fourier Transformation Infrared peaks of an ink formulation at different cure methods, according to various aspects of an inventive concept.

The SF was also characterized for separate UV-dependent and thermal-dependent curing rates during printing. Progress and extent of the acrylate and urethane reactions were analyzed using Fourier Transform-Infrared (FT-IR) spectroscopy as shown in FIG. 8A. SF samples having different cure conditions were measured observing the disappearance of reactant peaks 810 $cm^{-1}$ and 2272 $cm^{-1}$, representing carbon-hydrogen bond of acrylate component and isocyanate component, respectively. Relative peak intensities were tracked over separate curing stages: uncured/as prepared, UV-cured only, thermal-cured only (80° C. 24 h), and UV- and thermal-cured samples (UV+80° C. 24 h). The resulting overlaid spectrograms are shown in FIG. 8A and are representative of the stages of curing during the fabrication process. Comparing the Uncured and UV-cured only samples, the small peak at 810 $cm^{-1}$ disappeared almost completely, while the broad peak at 2272 $cm^{-1}$ remained unchanged, indicating the isocyanate is unaffected by the radical acrylate UV-curing mechanism. As expected, the sample exposed to UV radiation and subsequent heat curing at 80° C. (UV- and thermal-cured sample) showed in both peaks disappearing post curing. Samples that were thermal-cured only showed peaks of both isocyanate and carbon-hydrogen bond disappearing to the same extent as the two-step curing process.

These results suggested that complete resin curing may be achieved through a two-step curing process, UV-curing then thermal-curing, and a one-step thermal process. The peak typically at 1640 $cm^{-1}$ representing carbon-carbon double bonds of the acrylate was difficult to distinguish from adjacent peaks in the SF due to the low concentration of acrylates in the overall ink compared to much greater concentration of the carbonyl components from the polyester components in the PC polyols and from the newly formed carbonyls in the carbamate (urethane) components. Real-time (RT) FT-IR was performed on samples of 30 μm thick UGAP without solids loading while exposed to 1 mW $cm^{-2}$ of UV light to ensure the depletion of the 1640 $cm^{-1}$ peak.

Figure 8B:
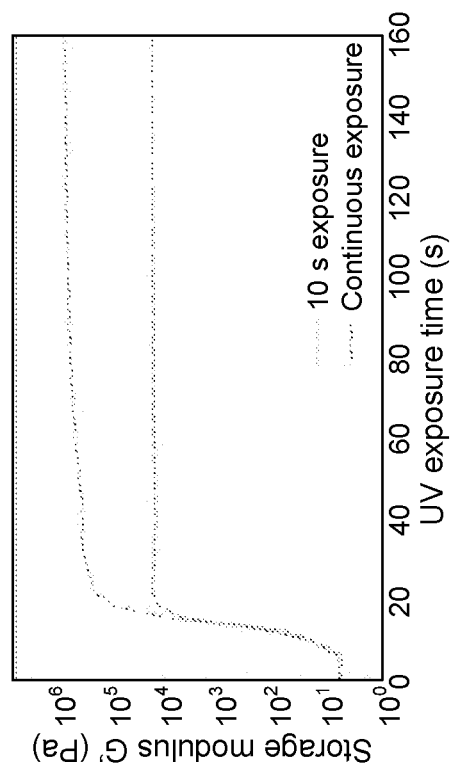
FIG. 8B is a plot of time to gelation for varying intensities of UV irradiation.

To quantify the UV-dependent curing rate on simulated extruded filaments, samples of the SF were placed in the rheometer between parallel-plate fixtures with a gap matching the filament diameter of 0.840 mm. The resulting storage and loss moduli of samples exposed to varying intensities between 0.2 and 1.0 mW $cm^{-2}$ were recorded for time to gelation (UV-exposure time in seconds, x-axis) shown in FIG. 8B. The gelation point throughout the entire material was indicated at tan(δ)=G″/G′=1. For each sample, similar rates of gelation are reached once an apparent critical number of free radicals have formed. The time required to reach this critical rate decreased inversely with the UV intensity. Additionally, the dramatic difference in rate of gelation seen in the sample exposed to 0.2 mW $cm^{-2}$ indicates that there exists a minimum threshold of UV-radiation intensity between 0.2 mW $cm^{-2}$ and 0.4 mW $cm^{-2}$ required to reach the same rate of gelation seen in each of the other samples. this supports a diffusion limiting phenomenon.

Typical light intensity and printing conditions were measured to be 0.6 mW $cm^{-2}$ with a spot size of ~20 mm in diameter and speeds of 15 mm $s^{-1}$, as demonstrated in part (f) of FIG. 4, FIG. 6B, FIGS. 9A-9G, FIGS. 10A-10C, and FIGS. 11A-11C. Under these conditions the SF would need over a minute of exposure to achieve a full-depth of cure.

However, a filament's actual exposure to UV radiation was dependent on the dimensions of the print article and the toolpath. Smaller objects (such as the printed lattice structures used for testing) were bathed in the UV spot continuously and could be printed at 15 mm $s^{-1}$. Nearly all the printed objects demonstrated toolpaths that allowed continuous exposure to UV radiation with an estimated total exposure of ~10 s/layer.

Figure 8C:
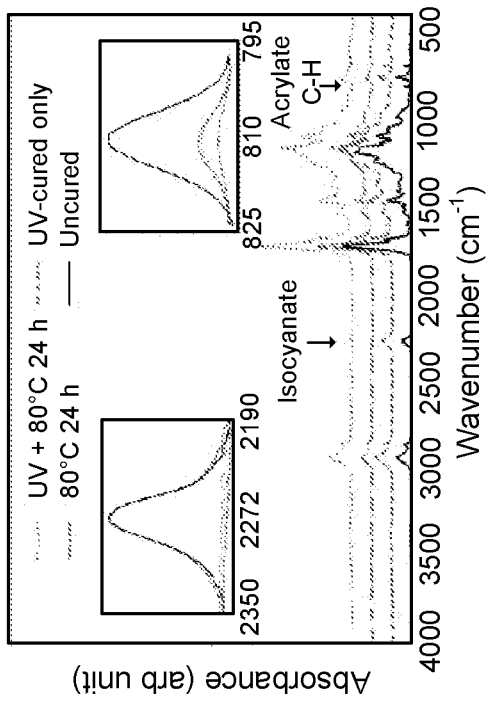
FIG. 8C is a plot of time to gelation for samples having varying thicknesses exposed to 1 mW cm$^{-2}$ UV light.
Figure 8D:
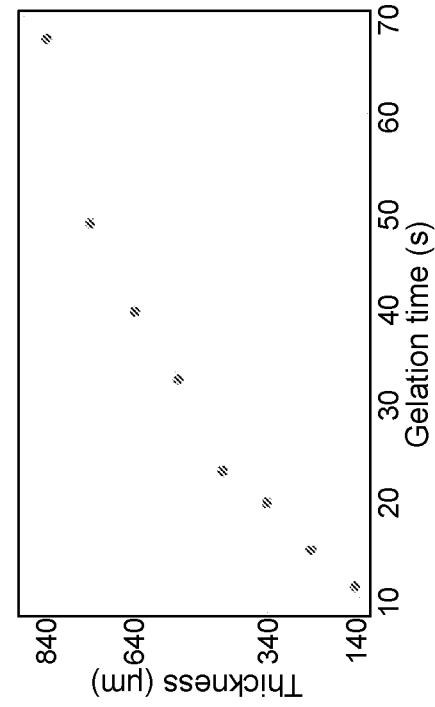
FIG. 8D is a plot of storage modulus versus UV exposure time comparing samples with a 10 second exposure and a continuous exposure to UV irradiation.

To understand the ramifications of these printing conditions UV dependent rheology was performed with a constant intensity of 0.6 mW $cm^{-2}$ for varying gap distances (i.e. ink thickness) between 0.140 and 0.840 mm to estimate a depth of cure as shown in FIG. 8C. These results indicate that for the roughly estimated 10 s of exposure each filament received, an outer shell of ~0.140 mm was formed. FIG. 8D shows a comparison of samples exposed to 10 seconds of UV radiation and samples having a continuous exposure to UV radiation. In addition, although the radical reaction was longer lived as shown in the increased storage modulus beyond 10 seconds for the 10 s exposed sample (dashed line), the sample did not reach the same cured state of the continuously exposed samples (dotted line). Without wishing to be bound by any theory, it is likely that the cured outer shell reaches the gelation point reinforcing the filaments allowing for significantly taller objects to be printed, even without a full depth of cure.

Additional testing was performed to observe the continued curing once the filaments were no longer exposed to UV-radiation sometimes called "dark cure". The storage modulus of a 0.140 mm sample exposed to 10 s of UV radiation shows that under realistic printing conditions gelation continues to increase for an additional ~8 s. This indicates that in addition to a cured outer shell, a gradient of cured material continues to form after the print is outside of the light beam. For larger demonstrated objects (e.g., hollow cone), printing speeds were reduced to 5 mm s−1 and resulted in a total exposure of ~4 seconds. It is hypothesized that a similar gradient of cured material forms, however rheological studies were not performed on thinner samples due to the gap of the rheometer parallel plates approaching the particle sizes within the resin.

Printing complex objects qualitatively and practically tests the limits of how quickly the curing occurs, how well the filaments knit together, and how self-supporting the UV-cured material is immediately after extrusion. The example objects described were all printed with the UV-light source on during the entire process at the print speed of 15 mm s$^{-1}$ with a 0.840 mm diameter nozzle.

All printed objects were stable and could be handled after UV curing but did not rebound under a significant applied force. Finished printed parts were heated in an oven at 80° C. for 24 h. After thermal cure, the objects did not exhibit any noticeable dimensional changes, indicating formation of a significant crosslinked matrix during the UV-curing holding the filaments against thermal or other expansion. These specific object designs were chosen to test the limits of the ink.

Images as shown on FIGS. 9A-9H and FIGS. 10A-10C represent examples of difficult-to-print parts using the ink and methods described herein. Looking to FIGS. 9A-9D show images of structures that represent large aspect ratio objects creating a large yield stress on the lower layers as well as stability against start-stop jitter in the stage motors. The printed structure in FIG. 9A is depicted from a side view, the structure having a height of almost 80 mm FIG. 9B is an X-ray CT image of the solid cylinder of FIG. 9A.

The images of FIG. 9C-9D show a structure having a large aspect ratio as a single filament hollow cylinder. FIG. 9C is a side view of a structure printed in a z-direction, in which the z-direction is perpendicular to the xy deposition plane, to a height of about 75 mm FIG. 9D is a top-down view of the structure showing the hollow center of the single filament cylinder.

The images of FIGS. 9E and 9F show structures printed continuously in the z-direction. The structures were printed with varying angled overhangs not fully supported by previous layers. As shown in the image of FIG. 9E one side has a 0° angle while the opposite side has a defined overhang at a 35° slope. As shown in the image of FIG. 9F, one side has a 15° overhang and the opposite side has a 45° overhang.

The image of FIG. 9G shows a printed structure having spans much larger than filament size. The image of FIG. 9H shows a symmetric free-form helix.

The images shown in FIGS. 10A-10C represent printed cone structures using inks and printing/cure processes described herein. The image of FIG. 10A shows a hollow cone printed with a two-filaments thickness.

As shown in images of FIGS. 10B-10C, objects were fabricated by printing an outer shell mold and subsequently infilling was demonstrated by printing a two-filament thick cone (wall at a 45°) and subsequently infilling it. The X-ray CT image of FIG. 10B shows an infilled cone that was then heat cured in a pressure chamber at 100 PSI at 60° C. for 24 h to suppress bubble expansion. The X-ray CT image of FIG. 10C shows an infilled cone that was then heat cured at ambient pressure. Previous attempts had demonstrated that heat curing the SF without UV-curing first resulted in a lower-density porous material. The cause is likely the higher vapor pressure acrylate monomers vaporizing during heating faster than their rate of thermal curing.

Hierarchical Porosity and Tunable Mechanical Properties

The fully cured material, being 24 wt % percent polycaprolactone polyurethane, formed a water permeable resin allowing easy removal of the NaCl particles from printed objects through leaching. The resulting foam was highly elastic and robust. Leaching of the NaCl was replicated multiple times on cast and print-architected samples, and in every case, it was found that quantitative removal of the NaCl particles was achievable. As expected, the rate of NaCl removal depended on the surface area contacting the water (i.e., distance required for water to permeate in and out). Low print density lattice structures were soaked in distilled water at 60° C. and were found to have leached all NaCl in a few hours compared to full-dense cast parts requiring days to reach quantitative removal. Although dissolution of water in NaCl is nearly independent of temperature at these modest temperatures, polymer swelling was affected by heat which increased the rate at which NaCl was removed. Besides the gravimetric evidence of 70 wt % loss after leaching, X-ray imaging of three lattices at 40%, 60%, and 80% printed lattice density FIG. 11A, FIG. 11B, and FIG. 11C, respectively, further confirmed the removal of NaCl from the internal portions of the filament. Although, residual NaCl particles were observed near the surface of the 80% dense lattice structure likely left behind when the extraction water evaporated on the surface leaving NaCl behind.

The pores left behind after NaCl extraction were characterized with SEM imaging of sectioned samples and shown FIGS. 11D-11G. The surface area of the NaCl extracted materials was measured by Kr BET and were 0.03-0.04 m$^2$g$^{-1}$. A simple calculation based on approximating the volume of the known particle sizes in the NaCl solid indicates that virtually all the porous structure came from the relatively low surface area salt particles that were leached from the sample and not from foaming caused by an adventitious blowing agent. Increasing the particle sizes to larger bimodal and monomodal distributions of NaCl resulted in significantly larger pore sizes. FIG. 11D is an SEM image of a printed structure using neat ink material of the resin sample (without NaCl particles). FIG. 11E is an SEM of a printed structure having porosity from small bimodal distribution of NaCl particles. FIG. 11F is an SEM image of a printed structure having porosity from large bimodal distribution of NaCl particles. FIG. 11G is an SEM image of a printed structure having porosity from large monomodal NaCl particles. Although removal of NaCl was possible, cast samples containing the large monomodal particles were friable.

The porous resins resulting from the NaCl leaching exhibited significantly different mechanical properties compared with the composite. The ultimate tensile stress of the porous resin was approximately ⅔ of the composite, but the strain to failure was 4 to 5 times greater in the porous resin (●), as shown in FIG. 12A.

The compression to 25% strain of glycerol formulation (■) with NaCl loaded composite was nearly a magnitude lower than the PC triol formulation (□) with NaCl loaded composite as shown in FIG. 12B. The isocyanate concentration was increased to maintain molar equivalence with the increased number of hydroxyl groups.

Compression to 25% strain on lattice structure with varying material densities of 40%, 60%, and 80% are exhibited in FIG. 12D. Print-architected lattice structures introduce another layer of hierarchical porosity.

Pore size served as another tunable variable affecting the mechanical properties of the NaCl leached composites as compression of samples containing small (●) and large bimodal distributions exhibited dramatic differences as shown in the plot of FIG. 12C.

In Use

In various inventive concepts described herein, a polyurethane segment of the UGAP has a nearly limitless design space. In one approach of the inventive concepts described herein include adapting inks for 3D printing of i) fully dense parts of nearly unlimited scale, solids filled or otherwise for composite parts, prototyping, fixturing, etc., ii) scaffolds for metals and ceramics that are post-processed into other structured materials, iii) tunable energy absorbing foams, iv) intentionally architected foams as catalyst support for gaseous and liquid phase reactions, and v) intentionally architected foams for cellular growth and bio-implant applications. These are examples of applications of the inventive concepts described herein and are not meant to be limiting in any way.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of inventive concepts have been described above, it should be understood that they have been presented by way of example only, and not limitation. Thus, the breadth and scope of an aspect of the present invention should not be limited by any of the above-described exemplary approach, but should be defined only in accordance with the following claims and their equivalents.

What is claimed is:

1. An ink, comprising
a nonradiation-curable pre-polymer having at least one molecule that comprises two nonradiation-curable components and a radiation-curable component;
a polymer having at least one reactive hydrogen component; and
a photoinitiator,
wherein a concentration of the nonradiation-curable pre-polymer having at least two nonradiation-curable components is in a range of greater than 0 weight % to less than 99 weight % of a total weight of the ink.

2. An ink as recited in claim 1, wherein the nonradiation-curable pre-polymer comprises the at least two nonradiation-curable components linked by a linker.

3. An ink as recited in claim 2, wherein the nonradiation-curable pre-polymer comprises the radiation-curable component coupled to the linker.

4. An ink as recited in claim 1, wherein the radiation-curable component is selected from the group consisting of: an acrylate, a thiol-ene, an epoxy, a vinyl, and a combination thereof.

5. An ink as recited in claim 1, wherein a concentration of the radiation-curable component is in a range of greater than 0 weight % to less than 99 weight % of a total weight of the ink.

6. An ink as recited in claim 1, wherein at least one of the at least two nonradiation-curable components of the nonradiation-curable pre-polymer include an isocyanate component.

7. An ink as recited in claim 6, wherein the polymer having at least one reactive hydrogen component is a polyamine, wherein the at least one reactive hydrogen component is an amine component, wherein the isocyanate component and amine component are configured to form a urea linkage.

8. An ink as recited in claim 6, the polymer having at least one reactive hydrogen component is a polyol, wherein the at least one reactive hydrogen component is an alcohol component, wherein the isocyanate component and the alcohol component are configured to form a urethane linkage.

9. An ink as recited in claim 8, wherein a ratio of the alcohol component to the isocyanate component in the ink is at least 1:1.

10. An ink as recited in claim 8, wherein the alcohol component includes a diol component.

11. An ink as recited in claim 8, wherein the alcohol component includes both a diol component and a polyalcohol component having the chemical formula $R(OH)_n$, wherein $n>1$.

12. An ink as recited in claim 11, wherein a ratio of the diol component to the polyalcohol component is greater than about 1:1.

13. An ink as recited in claim 1, wherein a concentration of the photoinitiator is greater than 0.1 weight % of a total weight of the ink.

14. An ink as recited in claim 1, comprising a solid.

15. An ink as recited in claim 14, wherein a concentration of the solid is less than 75 volume % of a total volume of the ink.

16. An ink as recited in claim 14 wherein the solid is a porogen.

17. An ink as recited in claim 16, wherein the solid is solvable, wherein the solid is configured to be removed post-processing.

18. An ink as recited in claim 17, wherein the solvable solid includes sodium chloride particles.

19. An ink as recited in claim 14, wherein the solid includes a reinforcing material.

20. An ink as recited in claim 19, wherein the solid includes material selected from the group consisting of: nanoclay, fumed silica, graphene, carbon fiber, fiber glass, and carbon nanotubes.

21. An ink as recited in claim 14, wherein the solid includes an inorganic material.

22. An ink as recited in claim 21, wherein the inorganic material is selected from the group consisting of: metal oxide, metal, and inorganic composites.

23. An ink as recited in claim 14, wherein the solid includes a reactive material.

24. An ink as recited in claim 23, wherein the reactive material is selected from the group consisting of: an explosive, a propellent, and a thermite.

25. A method of forming a three-dimensional product, the method comprising:
- extruding an ink from a nozzle to form a printed three-dimensional product, the ink comprising:
- a nonradiation-curable pre-polymer having at least two nonradiation-curable components per molecule of the nonradiation-curable pre-polymer,
- a radiation-curable component,
- a polymer having at least one reactive hydrogen component, and
- a photoinitiator; and
- directing an ultraviolet (UV) light toward the nozzle for irradiating the extruded ink to form a three-dimensional product having a plurality of continuous filaments arranged in a geometric pattern, the filaments comprising the radiation-cured component.

* * * * *